US012367809B2

(12) United States Patent
Hwang et al.

(10) Patent No.: US 12,367,809 B2
(45) Date of Patent: *Jul. 22, 2025

(54) DISPLAY DEVICE AND TILED DISPLAY DEVICE

(71) Applicant: Samsung Display Co., LTD., Yongin-si (KR)

(72) Inventors: Jung Hwan Hwang, Yongin-si (KR); Hyun Joon Kim, Yongin-si (KR); Kye Uk Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,167

(22) Filed: Apr. 21, 2023

(65) Prior Publication Data

US 2024/0038147 A1 Feb. 1, 2024

(30) Foreign Application Priority Data

Aug. 1, 2022 (KR) ........................ 10-2022-0095627

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2300/026* (2013.01);
(Continued)

(58) Field of Classification Search
CPC .... G09G 3/32; G09G 3/006; G09G 2300/026; G09G 2300/0426; G09G 2310/0275;
(Continued)

(56) References Cited

U.S. PATENT DOCUMENTS

| | | | | |
|---|---|---|---|---|
| 2018/0233550 A1* | 8/2018 | Han | ..................... | H10K 59/131 |
| 2019/0371231 A1* | 12/2019 | Kim | ..................... | G09G 3/2003 |

(Continued)

FOREIGN PATENT DOCUMENTS

| | | |
|---|---|---|
| EP | 4170641 A1 | 4/2023 |
| KR | 10-2020-0115003 A | 10/2020 |
| WO | WO 2020/204487 A1 | 10/2020 |

*Primary Examiner* — Temesghen Ghebretinsae
*Assistant Examiner* — Sosina Abebe
(74) *Attorney, Agent, or Firm* — Womble Bond Dickinson (US) LLP

(57) ABSTRACT

A display device includes: first sub-pixels commonly connected to a first global data line, each including a first light emitting element to emit light of a first color; and second sub-pixels commonly connected to a second global data line different from the first global data line, each including a second light emitting element to emit light of a second color different from the first color. At least one of the first sub-pixels includes: a first circuit to supply a driving current to the first light emitting element based on a first global data voltage received from the first global data line; a second circuit to control a supply period of the driving current based on a data voltage received from a data line; and a test transistor including a first electrode connected to an anode of the first light emitting element, and a second electrode connected to the data line.

20 Claims, 22 Drawing Sheets

(52) U.S. Cl.
CPC ............... *G09G 2300/0426* (2013.01); *G09G 2310/0275* (2013.01); *G09G 2320/0633* (2013.01); *G09G 2330/12* (2013.01)

(58) Field of Classification Search
CPC ....... G09G 2320/0633; G09G 2330/12; G09G 3/2014; G09G 3/2081; G09G 3/3233; G09G 3/2011; G09G 2300/0443; G09G 2300/0819; G09G 2300/0852; G09G 2300/0861; G09G 2310/0216; G09G 2310/0251; G09G 2310/0259; G09G 2310/0262; G09G 2310/066; G09G 2320/0295; G09G 3/3225; G09G 2300/0842; G09G 2310/0267; H01L 27/124; H01L 33/38; H01L 33/44
See application file for complete search history.

(56) References Cited

U.S. PATENT DOCUMENTS

| | | | | |
|---|---|---|---|---|
| 2020/0394953 | A1 | 12/2020 | Kim et al. | |
| 2022/0037301 | A1* | 2/2022 | Jeon ...................... | H01L 27/124 |
| 2023/0120477 | A1* | 4/2023 | Hwang ................ | G09G 3/2011 345/76 |

* cited by examiner

DISPLAY DEVICE AND TILED DISPLAY DEVICE

CROSS-REFERENCE TO RELATED APPLICATION

This application claims priority to and the benefit of Korean Patent Application No. 10-2022-0095627, filed on Aug. 1, 2022, the entire content of which is incorporated by reference herein.

BACKGROUND

1. Field

Aspects of embodiments of the present disclosure relate to a display device and a tiled display device.

2. Description of the Related Art

As information technology is developed, the importance of a display device, which is a connection medium between a user and information, has been highlighted. Thus, the use of display devices, such as a liquid crystal display device and an organic light emitting display device, has been increasing.

According to a demand for the enlargement of a display device, a tiled display device including a plurality of display devices may be used. In addition, an electrical test may be used for checking whether pixel circuits normally operate.

The above information disclosed in this Background section is for enhancement of understanding of the background of the present disclosure, and therefore, it may contain information that does not constitute prior art.

SUMMARY

Embodiments of the present disclosure are directed to a display device and a tiled display device capable of electrically testing a PAM circuit and a PWM circuit of a pixel circuit.

According to one or more embodiments of the present disclosure, a display device includes: first sub-pixels commonly connected to a first global data line, each of the first sub-pixels including a first light emitting element configured to emit light of a first color; and second sub-pixels commonly connected to a second global data line different from the first global data line, each of the second sub-pixels including a second light emitting element configured to emit light of a second color different from the first color. At least one of the first sub-pixels includes: a first circuit configured to supply a driving current to the first light emitting element based on a first global data voltage received from the first global data line; a second circuit configured to control a supply period of the driving current based on a data voltage received from a data line; and a test transistor including a first electrode connected to an anode of the first light emitting element, and a second electrode connected to the data line.

In an embodiment, the second circuit may include: a first transistor including a gate electrode connected to a first node, a first electrode connected to a second node, and a second electrode connected to a third node; a second transistor including a gate electrode connected to a scan line, a first electrode connected to the data line, and a second electrode connected to the second node; a third transistor including a gate electrode connected to the scan line, a first electrode connected to the first node, and a second electrode connected to the third node; a fourth transistor including a gate electrode connected to a first initialization line, a first electrode connected to the first node, and a second electrode connected to a first voltage line; and a first capacitor including a first electrode connected to a sweep line, and a second electrode connected to the first node.

In an embodiment, the second circuit may further include: a fifth transistor including a gate electrode connected to a first light emitting line, a first electrode connected to a second voltage line, and a second electrode connected to the second node; a sixth transistor including a gate electrode connected to the first light emitting line, a first electrode connected to the third node, and a second electrode connected to a fourth node; a seventh transistor including a gate electrode connected to a second initialization line, a first electrode connected to the fourth node, and a second electrode connected to the first voltage line; and an eighth transistor including a gate electrode connected to the second initialization line, a first electrode connected to the sweep line, and a second electrode connected to a third voltage line.

In an embodiment, the first circuit may include: a ninth transistor including a gate electrode connected to a fifth node, a first electrode connected to a sixth node, and a second electrode connected to a seventh node; a tenth transistor including a gate electrode connected to the scan line, a first electrode connected to the first global data line, and a second electrode connected to the sixth node; an eleventh transistor including a gate electrode connected to the scan line, a first electrode connected to the fifth node, and a second electrode connected to the seventh node; a twelfth transistor including a gate electrode connected to the first initialization line, a first electrode connected to the fifth node, and a second electrode connected to the first voltage line; a thirteenth transistor including a gate electrode connected to the first light emitting line, a first electrode connected to a first power line, and a second electrode connected to the sixth node; a fourteenth transistor including a gate electrode connected to a second light emitting line, a first electrode, and a second electrode connected to the anode; and a fifteenth transistor including a gate electrode connected to the fourth node, a first electrode connected to the seventh node, and a second electrode connected to the first electrode of the fourteenth transistor.

In an embodiment, the first circuit may further include: a second capacitor including a first electrode, and a second electrode connected to the fifth node; a sixteenth transistor including a gate electrode connected to the first light emitting line, a first electrode connected to the first electrode of the second capacitor, and a second electrode connected to the first power line; a seventeenth transistor including a gate electrode connected to the second initialization line, a first electrode connected to the second voltage line, and a second electrode connected to the first electrode of the second capacitor; a third capacitor including a first electrode connected to the fourth node, and a second electrode connected to the first voltage line; and an eighteenth transistor including a gate electrode connected to the second initialization line, a first electrode connected to the anode, and a second electrode connected to a second power line.

In an embodiment, the first circuit may include: a ninth transistor including a gate electrode connected to a fifth node, a first electrode connected to a sixth node, and a second electrode connected to a seventh node; a tenth transistor including a gate electrode connected to the scan line, a first electrode connected to the first global data line, and a second electrode connected to the sixth node; an eleventh transistor including a gate electrode connected to the scan line, a first electrode connected to the fifth node, and a second electrode connected to the seventh node; a twelfth transistor including a gate electrode connected to the first initialization line, a first electrode connected to the fifth node, and a second electrode connected to the first voltage line; a thirteenth transistor including a gate electrode connected to the first light emitting line, a first electrode connected to a first power line, and a second electrode connected to the sixth node; and a second capacitor including a first electrode connected to the fourth node, and a second electrode connected to the fifth node.

In an embodiment, the first circuit may further include: a fourteenth transistor including a gate electrode connected to a second light emitting line, a first electrode connected to the seventh node, and a second electrode connected to the anode; and an eighteenth transistor including a gate electrode connected to the second initialization line, a first electrode connected to the anode, and a second electrode connected to a second power line.

In an embodiment, the second circuit may include: a first transistor including a gate electrode connected to a first node, a first electrode connected to a second node, and a second electrode connected to a third node; a second transistor including a gate electrode connected to a first scan line, a first electrode connected to the data line, and a second electrode connected to the second node; a third transistor including a gate electrode connected to the first scan line, a first electrode connected to the first node, and a second electrode connected to the third node; a fourth transistor including a gate electrode connected to a first initialization line, a first electrode connected to the first node, and a second electrode connected to a first voltage line; and a first capacitor including a first electrode connected to a sweep line, and a second electrode connected to the first node.

In an embodiment, the second circuit may further include: a fifth transistor including a gate electrode connected to a first light emitting line, a first electrode connected to a second voltage line, and a second electrode connected to the second node; a sixth transistor including a gate electrode connected to the first light emitting line, a first electrode connected to the third node, and a second electrode connected to a fourth node; and an eighth transistor including a gate electrode connected to a second initialization line, a first electrode connected to the sweep line, and a second electrode connected to a third voltage line.

In an embodiment, the first circuit may include: a ninth transistor including a gate electrode connected to the fourth node, a first electrode connected to a fifth node, and a second electrode connected to a sixth node; a tenth transistor including a gate electrode connected to a second scan line, a first electrode connected to the first global data line, and a second electrode connected to the fifth node; an eleventh transistor including a gate electrode connected to the second scan line, a first electrode connected to the fourth node, and a second electrode connected to the sixth node; a twelfth transistor including a gate electrode connected to the second initialization line, a first electrode connected to the fourth node, and a second electrode connected to the first voltage line; a thirteenth transistor including a gate electrode connected to the first light emitting line, a first electrode connected to a first power line, and a second electrode connected to the fifth node; and a second capacitor including a first electrode, and a second electrode connected to the fourth node.

In an embodiment, the first circuit may further include: a fourteenth transistor including a gate electrode connected to a second light emitting line, a first electrode connected to the sixth node, and a second electrode connected to the anode; a sixteenth transistor including a gate electrode connected to the first light emitting line, a first electrode connected to the first power line, and a second electrode connected to the first electrode of the second capacitor; a seventeenth transistor including a gate electrode connected to the second scan line, a first electrode connected to the second voltage line, and a second electrode connected to the first electrode of the second capacitor; and an eighteenth transistor including a gate electrode connected to the second scan line, a first electrode connected to the anode, and a second electrode connected to a second power line.

According to one or more embodiments of the present disclosure, a tiled display device includes: a plurality of display devices; and a seam between the plurality of display devices. A first display device from among the plurality of display devices includes: first sub-pixels commonly connected to a first global data line, each of the first sub-pixels including a first light emitting element configured to emit light of a first color; and second sub-pixels commonly connected to a second global data line different from the first global data line, each of the second sub-pixels including a second light emitting element configured to emit light of a second color different from the first color. At least one of the first sub-pixels further includes a test transistor including a first electrode connected to an anode of the first light emitting element, and a second electrode connected to a data line different from the first global data line.

In an embodiment, each of the first light emitting element and the second light emitting element may be a flip chip type of a micro light emitting diode element.

In an embodiment, the first display device may further include a substrate configured to support the first sub-pixels and the second sub-pixels on a first surface of the substrate, and the substrate may include glass.

In an embodiment, the first display device may include: a pad on the first surface of the substrate; a first back surface pad on a second surface of the substrate opposite to the first surface of the substrate; and a side surface line covering a portion of a side surface of the substrate, and connecting the pad and the first back surface pad to each other.

In an embodiment, the first display device may further include: a second back surface pad on the second surface of the substrate; and a flexible film connected to the second back surface pad through a conductive adhesive member.

In an embodiment, the first display device may further include a light blocking layer on the first surface of the substrate, the light blocking layer overlapping with the first light emitting element and the second light emitting element, and not overlapping with transistors configuring the first sub-pixels and the second sub-pixels.

In an embodiment, a disposition direction of a cathode and an anode of the first light emitting element may be opposite to a disposition direction of a cathode and an anode of the second light emitting element.

In an embodiment, the first display device may further include third sub-pixels, each including a third light emitting element configured to emit light of a third color different from the first color and the second color, and a disposition direction of a cathode and an anode of the third light emitting element may be the same as the disposition direction of the cathode and the anode of the second light emitting element.

In an embodiment, the first global data line, the second global data line, and the data line may be located at the same metal layer as each other.

According to one or more embodiments of the present disclosure, the display device and the tiled display device may electrically test not only a PAM circuit of a pixel circuit, but a PWM circuit of the pixel circuit as well.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION OF THE EMBODIMENT

Figure 1:
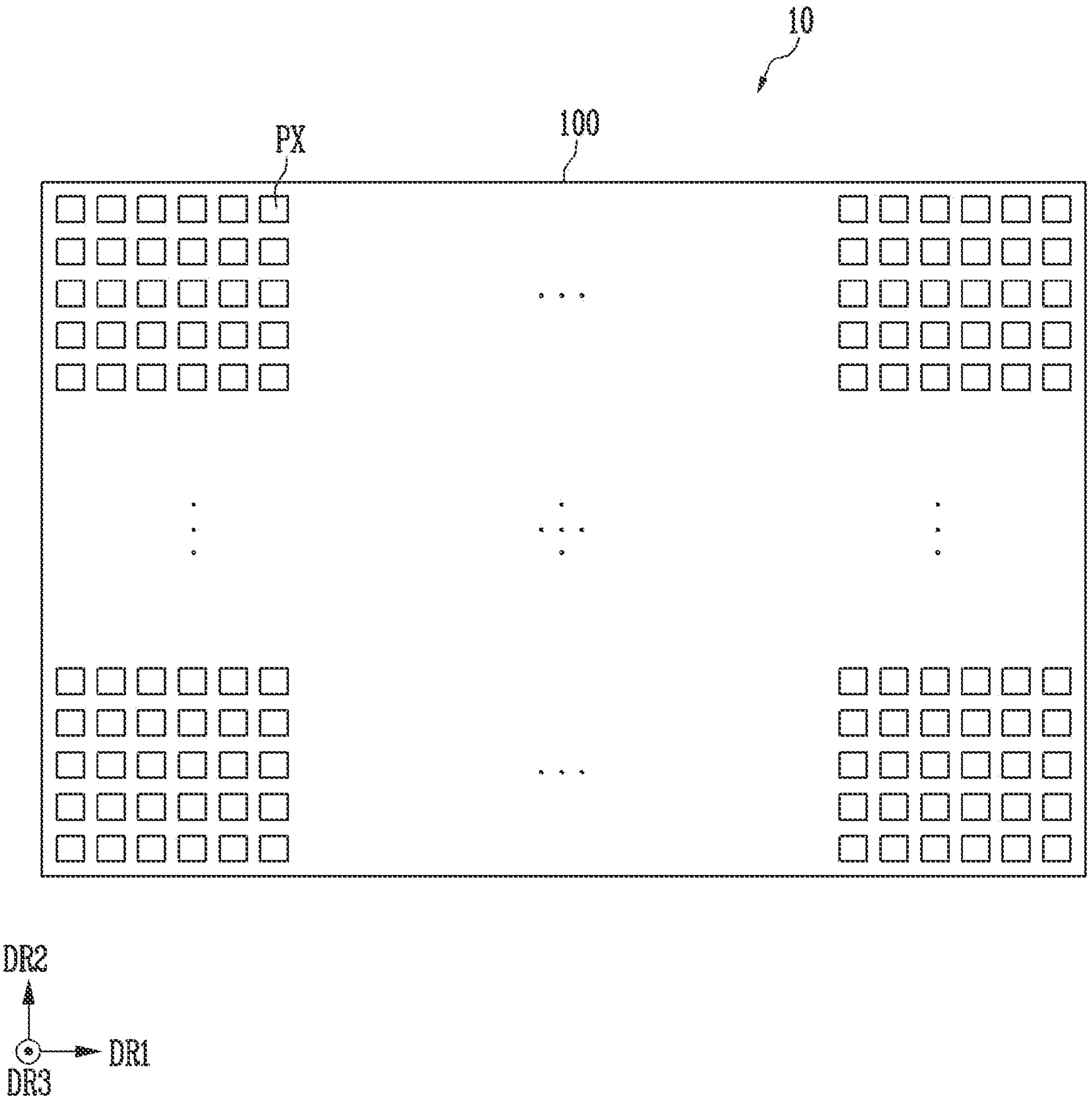
FIG. 1 is a plan view illustrating a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
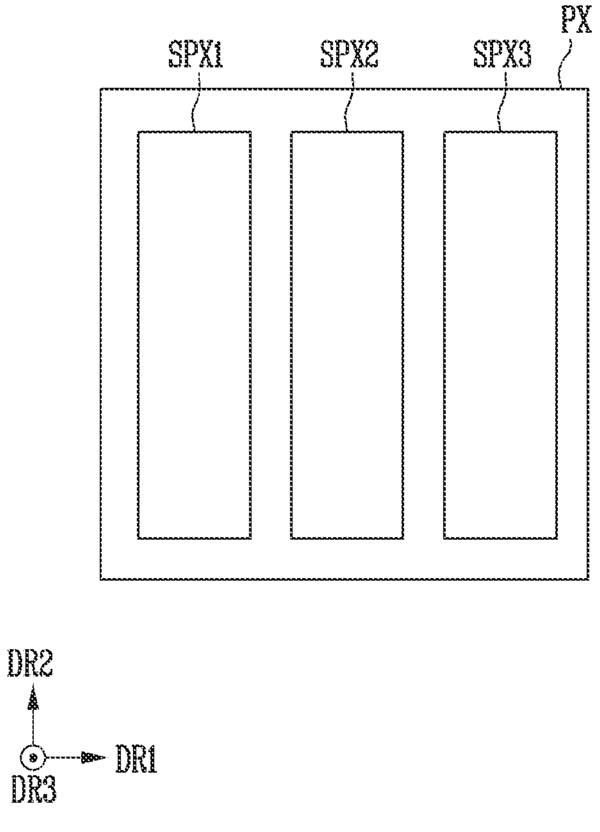
FIG. 2 is a diagram illustrating an example of a pixel of FIG. 1.
Figure 3:
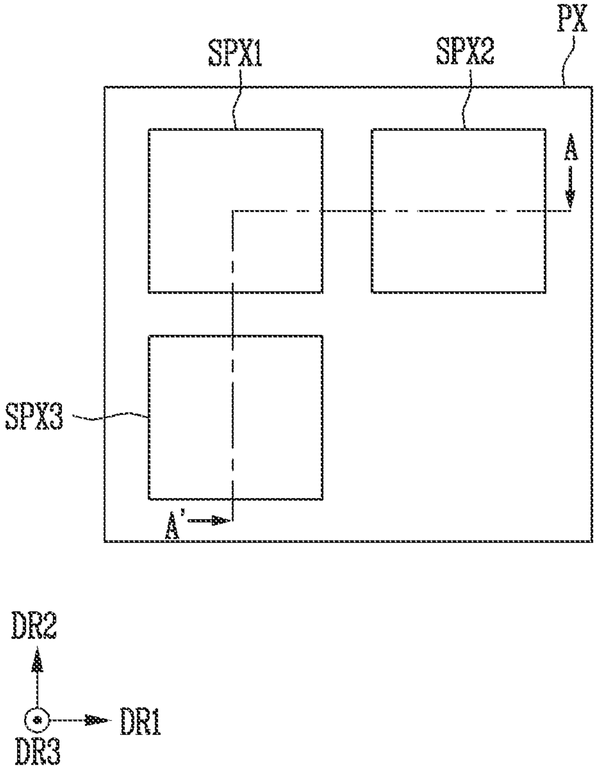
FIG. 3 is a diagram illustrating another example of the pixel of FIG. 1.

FIG. 1 is a plan view illustrating a display device according to an embodiment. FIG. 2 is a diagram illustrating an example of a pixel of FIG. 1. FIG. 3 is a diagram illustrating another example of the pixel of FIG. 1.

Referring to FIG. 1, the display device 10 is a device for displaying a video and/or a still image. The display device 10 may be used as a display screen of various suitable products. For example, such products may include a portable electronic device, such as a mobile phone, a smart phone, a tablet personal computer (PC), a smart watch, a watch phone, a mobile communication terminal, an electronic notebook, an electronic book, a portable multimedia player (PMP), a navigation device, and an ultra mobile PC (UMPC), as well as a television, a notebook computer, a monitor, a billboard, and an Internet of things (IOT) device.

A display panel 100 may be formed in a plane or substantially in a plane of a rectangular shape having a long side extending in a first direction DR1, and a short side extending in a second direction DR2 crossing (e.g., intersecting) the first direction DR1. A corner where the long side extending in the first direction DR1 and the short side extending in the second direction DR2 meet each other may be formed to be rounded to have a suitable curvature (e.g., a predetermined curvature), or may be formed in a right angle. A planar shape of the display panel 100 is not limited to a quadrangle, and may be formed in another suitable polygon, a circle, or an ellipse. The display panel 100 may be formed to be flat or substantially flat, but is not limited thereto. For example, the display panel 100 may include a curved portion formed at left and right ends thereof, and having a constant or substantially constant curvature, or a varying curvature. In addition, the display panel 100 may be flexibly formed to be crooked, curved, bent, folded, or rolled.

The display panel 100 may further include pixels PX to display an image, scan lines extending in the first direction DR1, and data lines extending in the second direction DR2. The pixels PX may be arranged in a matrix shape along the first direction DR1 and the second direction DR2.

Each of the pixels PX may include a plurality of sub-pixels SPX1, SPX2, and SPX3, as shown in FIGS. 2 and 3. FIGS. 2 and 3 illustrate that each of the pixels PX includes three sub-pixels SPX1, SPX2, and SPX3, or in other words, a first sub-pixel SPX1, a second sub-pixel SPX2, and a third sub-pixel SPX3. However, the present disclosure is not limited thereto.

The first sub-pixel SPX1, the second sub-pixel SPX2, and the third sub-pixel SPX3 may be connected to any suitable one of the data lines, and to at least one scan line from among the scan lines.

Each of the first sub-pixel SPX1, the second sub-pixel SPX2, and the third sub-pixel SPX3 may have a planar shape of a rectangle, a square, or a rhombus. For example, each of the first sub-pixel SPX1, the second sub-pixel SPX2, and the third sub-pixel SPX3 may have a planar shape of a rectangle having a short side extending in the first direction DR1, and a long side extending in the second direction DR2 as shown in FIG. 2. As another example, each of the first sub-pixel SPX1, the second sub-pixel SPX2, and the third sub-pixel SPX3 may have a planar shape of a square or a rhombus including sides having the same or substantially the same length as each other in the first direction DR1 and the second direction DR2 as shown in FIG. 3.

As shown in FIG. 2, the first sub-pixel SPX1, the second sub-pixel SPX2, and the third sub-pixel SPX3 may be arranged along the first direction DR1. As another example, any one of the second sub-pixel SPX2 and the third sub-pixel SPX3 may be arranged along the first direction DR1 with the first sub-pixel SPX1, and the other of the second sub-pixel SPX2 and the third sub-pixel SPX3 may be arranged along the second direction DR2 with the first sub-pixel SPX1. For example, as shown in FIG. 3, the first sub-pixel SPX1 and the second sub-pixel SPX2 may be arranged along the first direction DR1, and the first sub-pixel SPX1 and the third sub-pixel SPX3 may be arranged along the second direction DR2.

As another example, any one of the first sub-pixel SPX1 and the third sub-pixel SPX3 may be arranged along the first direction DR1 with the second sub-pixel SPX2, and the other of the first sub-pixel SPX1 and the third sub-pixel SPX3 may be arranged along the second direction DR2 with the second sub-pixel SPX2. As another example, any one of the first sub-pixel SPX1 and the second sub-pixel SPX2 may be arranged along the first direction DR1 with the third sub-pixel SPX3, and the other of the first sub-pixel SPX1 and the second sub-pixel SPX2 may be arranged along the second direction DR2 with the third sub-pixel SPX3.

The first sub-pixel SPX1 may emit first light, the second sub-pixel SPX2 may emit second light, and the third sub-pixel SPX3 may emit third light. Here, the first light may be light of a red wavelength band, the second light may be light of a green wavelength band, and the third light may be light of a blue wavelength band. The red wavelength band may be a wavelength band of about 600 nm to 750 nm, the green wavelength band may be a wavelength band of about 480 nm to 560 nm, and the blue wavelength band may be a wavelength band of about 370 nm to 460 nm. However, the present disclosure is not limited thereto.

Each of the first sub-pixel SPX1, the second sub-pixel SPX2, and the third sub-pixel SPX3 may include an inorganic light emitting element including an inorganic semiconductor as a light emitting element that emits light. For example, the inorganic light emitting element may be a flip chip type of a micro light emitting diode (LED), but the present disclosure is not limited thereto.

As shown in FIGS. 2 and 3, the area of the first sub-pixel SPX1, the area of the second sub-pixel SPX2, and the area of the third sub-pixel SPX3 may be the same or substantially the same as each other, but the present disclosure is not limited thereto. At least one of the area of the first sub-pixel SPX1, the area of the second sub-pixel SPX2, and the area of the third sub-pixel SPX3 may be different from another area. As another example, any two of the area of the first sub-pixel SPX1, the area of the second sub-pixel SPX2, and the area of the third sub-pixel SPX3 may be the same or substantially the same as each other, and may be different from the area of the other remaining one. As another example, the area of the first sub-pixel SPX1, the area of the second sub-pixel SPX2, and the area of the third sub-pixel SPX3 may be different from each other.

Figure 4:
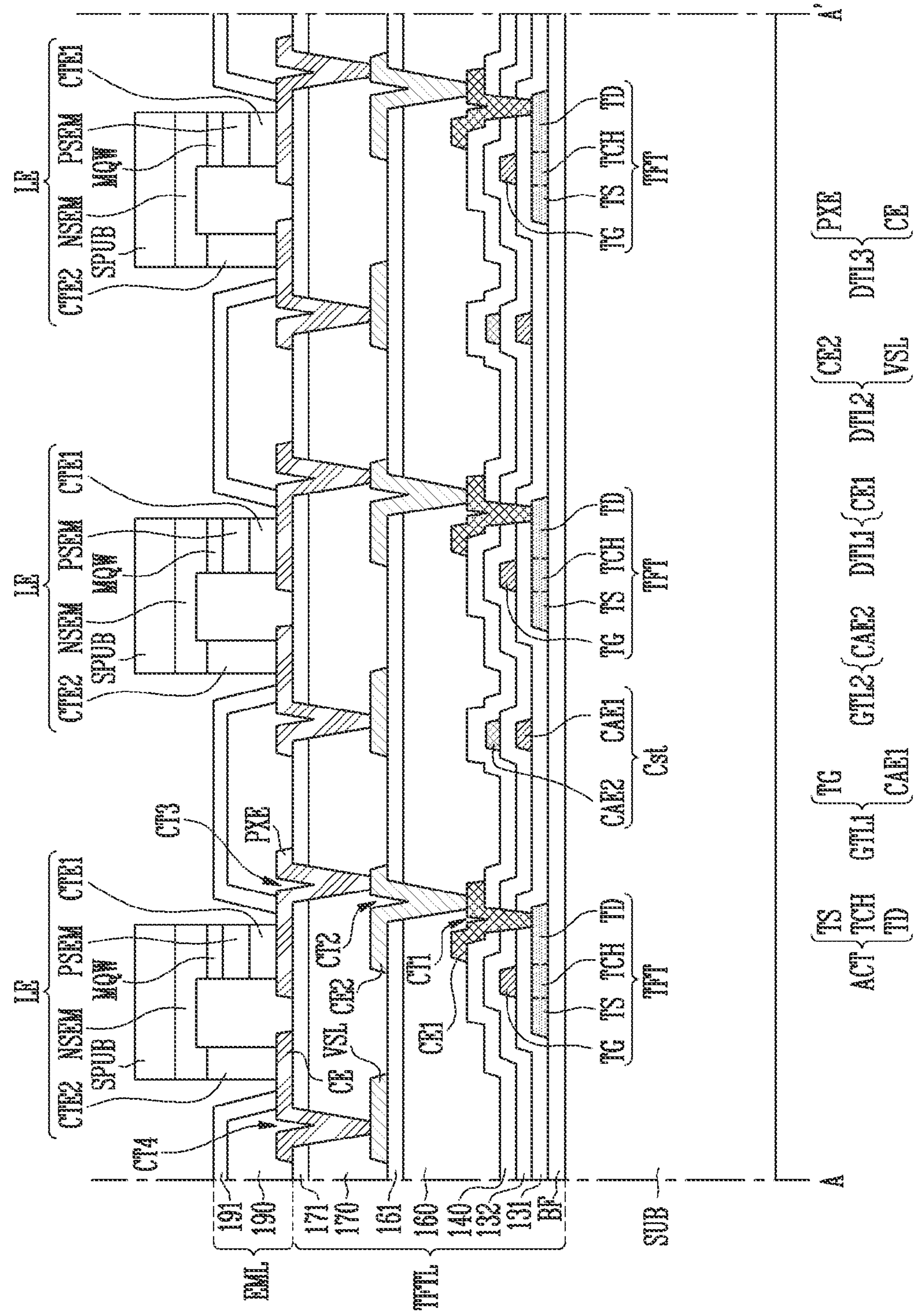
FIG. 4 is a cross-sectional view illustrating an example of the display device taken along the line A-A' of FIG. 3.

FIG. 4 is a cross-sectional view illustrating an example of the display device taken along the line A-A' of FIG. 3.

Referring to FIG. 4, a thin film transistor layer TFTL may be disposed on a substrate SUB. The thin film transistor layer TFTL may be a layer including thin film transistors (TFTs) (e.g., may be a layer in which the TFTs are formed).

The thin film transistor layer TFTL includes an active layer ACT, a first gate layer GTL1, a second gate layer GTL2, a first data metal layer DTL1, and a second data metal layer DTL2. In addition, the display panel 100 includes a buffer layer BF, a first gate insulating layer 131, a second gate insulating layer 132, an interlayer insulating layer 140, a first planarization layer 160, a first insulating layer 161, a second planarization layer 170, and a second insulating layer 171.

The substrate SUB may be a base substrate or a base member for supporting the display device 10. The substrate SUB may be a rigid substrate including a glass material. As another example, the substrate SUB may be a flexible substrate capable of bending, folding, rolling, or the like. In this case, the substrate SUB may include an insulating material, such as a polymer resin (e.g., such as polyimide (PI)).

The buffer layer BF may be disposed on one surface (e.g., a first surface) of the substrate SUB. The buffer layer BF may be a layer for preventing or substantially preventing penetration of air and/or moisture. The buffer layer BF may be formed of a plurality of inorganic layers that are alternately stacked. For example, the buffer layer BF may be formed of multilayers, in which one or more inorganic layers of a silicon nitride layer, a silicon oxynitride layer, a silicon oxide layer, a titanium oxide layer, and an aluminum oxide layer are alternately stacked. The buffer layer BF may be omitted as needed or desired.

The active layer ACT may be disposed on the buffer layer BF. The active layer ACT may include a silicon semiconductor, for example, such as polycrystalline silicon, single crystal silicon, low-temperature polycrystalline silicon, and/or amorphous silicon, or may include an oxide semiconductor.

The active layer ACT may include a channel TCH, a first electrode TS, and a second electrode TD of the thin film transistor TFT. The channel TCH of the thin film transistor TFT may be an area overlapping with a gate electrode TG of the thin film transistor TFT in a thickness direction (e.g., a third direction DR3) of the substrate SUB. The first electrode TS of the thin film transistor TFT may be disposed on one side of the channel TCH, and the second electrode TD may be disposed on another side of the channel TCH. The first electrode TS and the second electrode TD of the thin film transistor TFT may be areas that do not overlap with the gate electrode TG in the third direction DR3. The first electrode TS and the second electrode TD of the thin film transistor TFT may be areas in which an ion is doped to a semiconductor (e.g., the silicon semiconductor, the oxide semiconductor, or the like) to have conductivity.

The first gate insulating layer 131 may be disposed on the active layer ACT. The first gate insulating layer 131 may be formed of an inorganic layer, for example, such as a silicon nitride layer, a silicon oxynitride layer, a silicon oxide layer, a titanium oxide layer, or an aluminum oxide layer.

The first gate layer GTL1 may be disposed on the first gate insulating layer 131. The first gate layer GTL1 may include the gate electrode TG of the thin film transistor TFT, and a first capacitor electrode CAE1. The first gate layer GTL1 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

The second gate insulating layer 132 may be disposed on the first gate layer GTL1. The second gate insulating layer 132 may be formed of an inorganic layer, for example, such as a silicon nitride layer, a silicon oxynitride layer, a silicon oxide layer, a titanium oxide layer, or an aluminum oxide layer.

The second gate layer GTL2 may be disposed on the second gate insulating layer 132. The second gate layer GTL2 may include a second capacitor electrode CAE2. The second gate layer GTL2 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

The interlayer insulating layer 140 may be disposed on the second gate layer GTL2. The interlayer insulating layer 140 may be formed of an inorganic layer, for example, such as a silicon nitride layer, a silicon oxynitride layer, a silicon oxide layer, a titanium oxide layer, or an aluminum oxide layer.

The first data metal layer DTL1 including a first connection electrode CE1 may be disposed on the interlayer insulating layer 140. The first data metal layer DTL1 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

The first connection electrode CE1 may be connected to the first electrode TS or the second electrode TD of the thin film transistor TFT through a first contact hole CT1 passing through (e.g., penetrating) the second gate insulating layer 132 and the interlayer insulating layer 140.

The first planarization layer 160 for flattening or substantially flattening a step difference due to the active layer ACT, the first gate layer GTL1, the second gate layer GTL2, and the first data metal layer DTL1 may be formed on the first data metal layer DTL1. The first planarization layer 160 may be formed of an organic layer, for example, such as an acryl resin, an epoxy resin, a phenolic resin, a polyamide resin, or a polyimide resin.

The first insulating layer 161 may be disposed on the first planarization layer 160. The first insulating layer 161 may be formed of an inorganic layer, for example, such as a silicon nitride layer, a silicon oxynitride layer, a silicon oxide layer, a titanium oxide layer, or an aluminum oxide layer.

The second data metal layer DTL2 may be formed on the first insulating layer 161. The second data metal layer DTL2 may include a second connection electrode CE2 and a first power line VSL. The second connection electrode CE2 may be connected to the first connection electrode CE1 through a second contact hole CT2 passing through (e.g., penetrating) the first insulating layer 161 and the first planarization layer 160. The second data metal layer DTL2 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

The second planarization layer 170 for flattening or substantially flattening a step difference may be formed on the second data metal layer DTL2. The second planarization layer 170 may be formed of an organic layer, for example, such as an acryl resin, an epoxy resin, a phenolic resin, a polyamide resin, or a polyimide resin.

The second insulating layer 171 may be disposed on the second planarization layer 170. The second insulating layer 171 may be formed of an inorganic layer, for example, such as a silicon nitride layer, a silicon oxynitride layer, a silicon oxide layer, a titanium oxide layer, or an aluminum oxide layer.

A light emitting element layer EML may be disposed on the second insulating layer 171. The light emitting element layer EML includes pixel electrodes PXE, common electrodes CE, and light emitting elements LE. A third data metal layer DTL3 may include the pixel electrodes PXE and the common electrodes CE. Each of the first sub-pixel SPX1, the second sub-pixel SPX2, and the third sub-pixel SPX3 includes a corresponding light emitting element LE connected to a corresponding pixel electrode PXE and a corresponding common electrode CE. The pixel electrode PXE may be referred to as an anode electrode, and the common electrode CE may be referred to as a cathode electrode.

The pixel electrodes PXE and the common electrodes CE may be disposed on the second insulating layer 171. Each of the pixel electrodes PXE may be connected to a corresponding second connection electrode CE2 through a third contact hole CT3 passing through (e.g., penetrating) the second insulating layer 171 and the second planarization layer 170. Accordingly, each of the pixel electrodes PXE may be connected to the first electrode TS or the second electrode TD of a corresponding thin film transistor TFT through the first connection electrode CE1 and the second connection electrode CE2. Therefore, a pixel voltage or an anode voltage controlled by the thin film transistor TFT may be applied to the pixel electrode PXE.

Each of the common electrodes CE may be connected to the first power line VSL through a corresponding fourth contact hole CT4 passing through (e.g., penetrating) the second insulating layer 171 and the second planarization layer 170. Accordingly, a first power voltage of the first power line VSL may be applied to each of the common electrodes CE.

The pixel electrodes PXE and the common electrodes CE may include a metal material having a high reflectance, for example, such as a stacked structure of aluminum and titanium (e.g., Ti/Al/Ti), a stacked structure of aluminum and ITO (e.g., ITO/Al/ITO), an APC alloy, or a stacked structure of an APC alloy and ITO (e.g., ITO/APC/ITO). The APC alloy may be an alloy of silver (Ag), palladium (Pd), and copper (Cu).

FIG. 4 illustrates that each of the light emitting elements LE is a flip chip type of a micro LED, in which a first contact electrode CTE1 and a second contact electrode CTE2 are disposed to face the pixel electrode PXE and the common electrode CE. The light emitting element LE may be formed of an inorganic material, such as GaN. Each of a length of the first direction DR1, a length of the second direction DR2, and a length of the third direction DR3 of the light emitting element LE may be several to several hundred micrometers (μm). For example, each of the length of the first direction DR1, the length of the second direction DR2, and the length of the third direction DR3 of the light emitting element LE may be about 100 μm or less.

The light emitting elements LE may be grown on a semiconductor substrate, such as a silicon wafer, to be formed. Each of the light emitting elements LE may be directly transferred onto the corresponding pixel electrode PXE and the corresponding common electrode CE of the substrate SUB from the silicon wafer. As another example, each of the light emitting elements LE may be transferred onto the corresponding pixel electrode PXE and the corresponding common electrode CE of the substrate SUB through an electrostatic method using an electrostatic head, or a stamp method using an elastic polymer material, such as PDMS or silicon as a transfer substrate.

Each of the light emitting elements LE may be a light emitting structure including a base substrate SPUB, an n-type semiconductor NSEM, an active layer MQW, a p-type semiconductor PSEM, a first contact electrode CTE1, and a second contact electrode CTE2.

The base substrate SPUB may be a sapphire substrate, but the present disclosure is not limited thereto.

The n-type semiconductor NSEM may be disposed on one surface of the base substrate SPUB. For example, the n-type semiconductor NSEM may be disposed on a lower surface (e.g., a rear surface) of the base substrate SPUB. The n-type semiconductor NSEM may be formed of GaN doped with an n-type conductive dopant, such as Si, Ge, or Sn.

The active layer MQW may be disposed on a portion of one surface of the n-type semiconductor NSEM. The active layer MQW may include a suitable material of a single or multiple quantum well structure. When the active layer MQW includes the material of the multiple quantum well structure, the active layer MQW may have a structure in which a plurality of well layers and barrier layers are alternately stacked. In this case, the well layer may be formed of InGaN, and the barrier layer may be formed of GaN or AlGaN, but are not limited thereto. As another example, the active layer MQW may have a structure in which a semiconductor material having a large band gap energy and a semiconductor material having a small band gap energy are alternately stacked, and may also include group 3 to group 5 semiconductor materials that are different according to a wavelength band of emitted light.

The p-type semiconductor PSEM may be disposed on one surface of the active layer MQW. The p-type semiconductor PSEM may be formed of GaN doped with a p-type conductive dopant, such as Mg, Zn, Ca, Se, or Ba.

The first contact electrode CTE1 may be disposed on the p-type semiconductor PSEM, and the second contact electrode CTE2 may be disposed on another portion of the one surface of the n-type semiconductor NSEM. The other portion of the one surface of the n-type semiconductor NSEM on which the second contact electrode CTE2 is disposed may be disposed to be spaced apart from the portion of the one surface of the n-type semiconductor NSEM on which the active layer MQW is disposed.

The first contact electrode CTE1 and the pixel electrode PXE may be connected to (e.g., attached to or adhered to) each other through a conductive adhesive member, such as an anisotropic conductive film (ACF) or an anisotropic conductive paste (ACP). As another example, the first contact electrode CTE1 and the pixel electrode PXE may be connected to (e.g., attached to or adhered to) each other through a soldering process.

A bank 190 covering an edge of the pixel electrode PXE and an edge of the common electrode CE may be disposed on the second insulating layer 171. The bank 190 may be formed of an organic layer, such as an acryl resin, an epoxy resin, a phenolic resin, a polyamide resin, or a polyimide resin.

A bank insulating layer 191 may be disposed on the bank 190. The bank insulating layer 191 may cover the edge of the pixel electrode PXE and the edge of the common electrode CE. The bank insulating layer 191 may be formed of an inorganic layer, for example, such as a silicon nitride layer, a silicon oxynitride layer, a silicon oxide layer, a titanium oxide layer, or an aluminum oxide layer.

Figure 5:
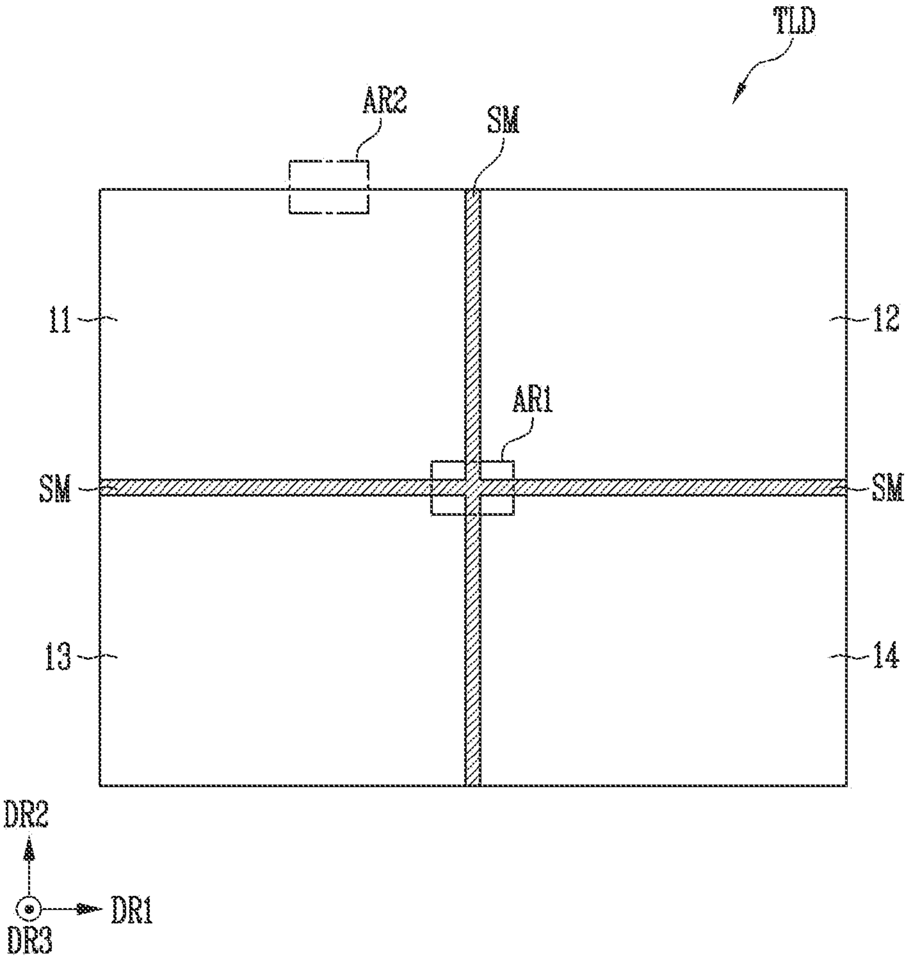
FIG. 5 is a perspective view illustrating a tiled display device including a plurality of display devices according to an embodiment.

FIG. 5 is a perspective view illustrating a tiled display device including a plurality of display devices according to an embodiment.

Referring to FIG. 5, the tiled display device TLD may include a plurality of display devices 11, 12, 13, and 14, and a seam SM. For example, the tiled display device TLD may include a first display device 11, a second display device 12, a third display device 13, and a fourth display device 14.

The plurality of display devices 11, 12, 13, and 14 may be arranged in a grid shape. The plurality of display devices 11, 12, 13, and 14 may be arranged in a matrix form having M number of rows and N number of columns, where M and N are positive integers. For example, the first display device 11 and the second display device 12 may be adjacent to each other in the first direction DR1. The first display device 11 and the third display device 13 may be adjacent to each other in the second direction DR2. The third display device 13 and the fourth display device 14 may be adjacent to each other in the first direction DR1. The second display device 12 and the fourth display device 14 may be adjacent to each other in the second direction DR2.

However, the number and the disposition of the plurality of display devices 11, 12, 13, and 14 in the tiled display device TLD are not limited to those illustrated in FIG. 5. The number and the disposition of the display devices 11, 12, 13, and 14 in the tiled display device TLD may be determined according to a size of each display device 10, a desired size of the tiled display device TLD, and a desired shape of the tiled display device TLD.

The plurality of display devices 11, 12, 13, and 14 may have the same or substantially the same size as each other, but is not limited thereto. For example, the plurality of display devices 11, 12, 13, and 14 may have different sizes from one another.

Each of the plurality of display devices 11, 12, 13, and 14 may have a rectangular shape including a long side and a short side. The plurality of display devices 11, 12, 13, and 14 may be disposed in a state in which the long sides or the short sides thereof are connected to each other. Some or all of the plurality of display devices 11, 12, 13, and 14 may be disposed at an edge of the tiled display device TLD, and may form a side (e.g., one side) of the tiled display device TLD. At least one display device from among the plurality of display devices 11, 12, 13, and 14 may be disposed at at least one corner of the tiled display device TLD, and may form two adjacent sides of the tiled display device TLD. At least one display device from among the plurality of display devices 11, 12, 13, and 14 may be surrounded (e.g., around a periphery thereof) by other display devices.

Each of the plurality of display devices 11, 12, 13, and 14 may be the same or substantially the same as the display device 10 described above with reference to FIGS. 1 to 4. Therefore, redundant description of each of the plurality of display devices 11, 12, 13, and 14 may not be repeated.

The seam SM may include a coupling member or an adhesive member. In this case, the plurality of display devices 11, 12, 13, and 14 may be connected to each other through the coupling member or the adhesive member of the seam SM. The seam SM may be disposed between the first display device 11 and the second display device 12, between the first display device 11 and the third display device 13, between the second display device 12 and the fourth display device 14, and between the third display device 13 and the fourth display device 14.

Figure 6:
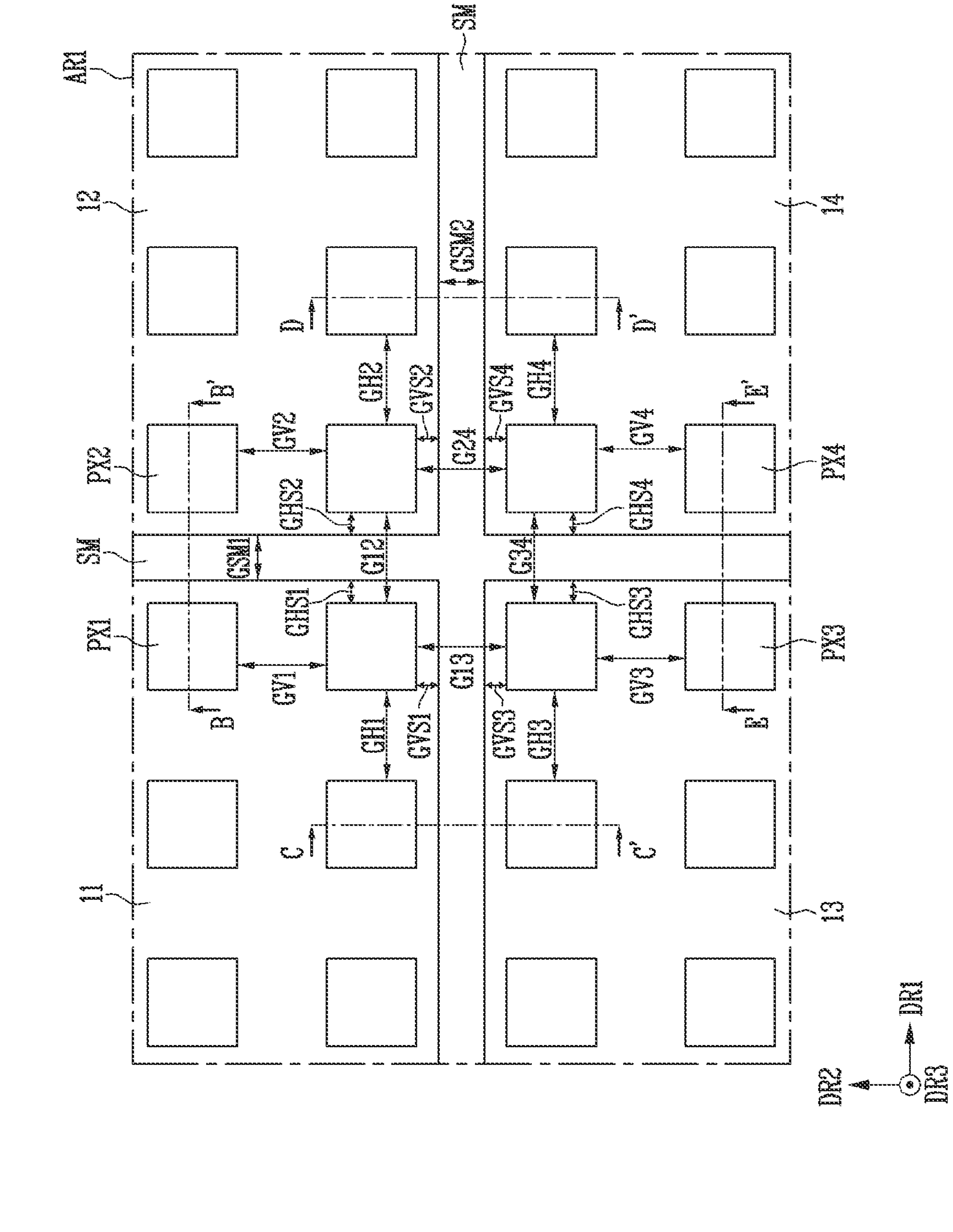
FIG. 6 is an enlarged layout diagram illustrating the area AR1 of FIG. 5 in more detail.

FIG. 6 is an enlarged layout diagram illustrating the area AR1 of FIG. 5 in more detail.

Referring to FIG. 6, the seam SM may have a planar shape of a crisscross, a cross, a plus sign, or the like in a center area of the tiled display device TLD in which the first display device 11, the second display device 12, the third display device 13, and the fourth display device 14 are adjacent to each other. The seam SM may be disposed between the first display device 11 and the second display device 12, between the first display device 11 and the third display device 13, between the second display device 12 and the fourth display device 14, and between the third display device 13 and the fourth display device 14.

The first display device 11 may include first pixels PX1 arranged in a matrix form along the first direction DR1 and the second direction DR2 to display an image. The second display device 12 may include second pixels PX2 arranged in a matrix form along the first direction DR1 and the second direction DR2 to display an image. The third display device 13 may include third pixels PX3 arranged in a matrix form along the first direction DR1 and the second direction DR2 to display an image. The fourth display device 14 may include fourth pixels PX4 arranged in a matrix form along the first direction DR1 and the second direction DR2 to display an image.

A minimum distance between the first pixels PX1 that are adjacent to each other in the first direction DR1 may be defined as a first horizontal separation distance GH1. A minimum distance between the second pixels PX2 that are adjacent to each other in the first direction DR1 may be defined as a second horizontal separation distance GH2. The first horizontal separation distance GH1 and the second horizontal separation distance GH2 may be the same or substantially the same as each other.

The seam SM may be disposed between the first pixel PX1 and the second pixel PX2 that are adjacent to each other in the first direction DR1. A minimum distance G12 between the first pixel PX1 and the second pixel PX2 that are adjacent to each other in the first direction DR1 may be a sum of a minimum distance GHS1 between the first pixel PX1 and the seam SM in the first direction DR1, a minimum distance GHS2 between the second pixel PX2 and the seam SM in the first direction DR1, and a width GSM1 of the seam SM in the first direction DR1.

The minimum distance G12 between the first pixel PX1 and the second pixel PX2 that are adjacent to each other in the first direction DR1, the first horizontal separation distance GH1, and the second horizontal separation distance GH2 may be the same or substantially the same as each other. Thus, the minimum distance GHS1 between the first pixel PX1 and the seam SM in the first direction DR1 may be less than the first horizontal separation distance GH1, and the minimum distance GHS2 between the second pixel PX2 and the seam SM in the first direction DR1 may be less than the second horizontal separation distance GH2. In addition, the width GSM1 of the seam SM in the first direction DR1 may be less than the first horizontal separation distance GH1 and/or the second horizontal separation distance GH2.

A minimum distance between the third pixels PX3 that are adjacent to each other in the first direction DR1 may be defined as a third horizontal separation distance GH3. A minimum distance between the fourth pixels PX4 that are adjacent to each other in the first direction DR1 may be defined as a fourth horizontal separation distance GH4. The third horizontal separation distance GH3 and the fourth horizontal separation distance GH4 may be the same or substantially the same as each other.

The seam SM may be disposed between the third pixel PX3 and the fourth pixel PX4 that are adjacent to each other in the first direction DR1. A minimum distance G34 between the third pixel PX3 and the fourth pixel PX4 that are adjacent to each other in the first direction DR1 may be a sum of a minimum distance GHS3 between the third pixel PX3 and the seam SM in the first direction DR1, a minimum distance GHS4 between the fourth pixel PX4 and the seam SM in the first direction DR1, and the width GSM1 of the seam SM in the first direction DR1.

The minimum distance G34 between the third pixel PX3 and the fourth pixel PX4 that are adjacent to each other in the first direction DR1, the third horizontal separation distance GH3, and the fourth horizontal separation distance GH4 are may be the same or substantially the same as each other. Thus, the minimum distance GHS3 between the third pixel PX3 and the seam SM in the first direction DR1 may be less than the third horizontal separation distance GH3, and the minimum distance GHS4 between the fourth pixel PX4 and the seam SM in the first direction DR1 may be less than the fourth horizontal separation distance GH4. In addition, the width GSM1 of the seam SM in the first direction DR1 may be less than the third horizontal separation distance GH3 and/or the fourth horizontal separation distance GH4.

A minimum distance between the first pixels PX1 that are adjacent to each other in the second direction DR2 may be defined as a first vertical separation distance GV1. A minimum distance between the third pixels PX3 in the second direction DR2 may be defined as a third vertical separation distance GV3. The first vertical separation distance GV1 and the third vertical separation distance GV3 may be the same or substantially the same as each other.

The seam SM may be disposed between the first pixel PX1 and the third pixel PX3 that are adjacent to each other in the second direction DR2. A minimum distance G13 between the first pixel PX1 and the third pixel PX3 that are adjacent to each other in the second direction DR2 may be a sum of a minimum distance GVS1 between the first pixel PX1 and the seam SM in the second direction DR2, a minimum distance GVS3 between the third pixel PX3 and the seam SM in the second direction DR2, and a width GSM2 of the seam SM in the second direction DR2.

The minimum distance G13 between the first pixel PX1 and the third pixel PX3 that are adjacent to each other in the second direction DR2, the first vertical separation distance GV1, and the third vertical separation distance GV3 may be the same or substantially the same as each other. Thus, the minimum distance GVS1 between the first pixel PX1 and the seam SM in the second direction DR2 may be less than the first vertical separation distance GV1, and the minimum distance GVS3 between the third pixel PX3 and the seam SM in the second direction DR2 may be less than the third vertical separation distance GV3. In addition, the width GSM2 of the seam SM in the second direction DR2 may be less than the first vertical separation distance GV1 and/or the third vertical separation distance GV3.

A minimum distance between the second pixels PX2 that are adjacent to each other in the second direction DR2 may be defined as a second vertical separation distance GV2, and a minimum distance between the fourth pixels PX4 that are adjacent to each other in the second direction DR2 may be defined as a fourth vertical separation distance GV4. The second vertical separation distance GV2 and the fourth vertical separation distance GV4 may be the same or substantially the same as each other.

The seam SM may be disposed between the second pixel PX2 and the fourth pixel PX4 that are adjacent to each other in the second direction DR2. A minimum distance G24 between the second pixel PX2 and the fourth pixel PX4 that are adjacent to each other in the second direction DR2 may be a sum of a minimum distance GVS2 between the second pixel PX2 and the seam SM in the second direction DR2, a minimum distance GVS4 between the fourth pixel PX4 and the seam SM in the second direction DR2, and the width GSM2 of the seam SM in the second direction DR2.

The minimum distance G24 between the second pixel PX2 and the fourth pixel PX4 that are adjacent to each other in the second direction DR2, the second vertical separation distance GV2, and the fourth vertical separation distance GV4 may be the same or substantially the same as each other. Thus, the minimum distance GVS2 between the second pixel PX2 and the seam SM in the second direction DR2 may be less than the second vertical separation distance GV2, and the minimum distance GVS4 between the fourth pixel PX4 and the seam SM in the second direction DR2 may be less than the fourth vertical separation distance GV4. In addition, the width GSM2 of the seam SM in the second direction DR2 may be less than the second vertical separation distance GV2 and/or the fourth vertical separation distance GV4.

As shown in FIG. 6, the minimum distance between the pixels of the display devices that are adjacent to each other may be the same or substantially the same as the minimum distance between the pixels of each of the display devices, so that the seam SM may not be visually recognized between the images displayed by the plurality of display devices 11, 12, 13, and 14.

Figure 7:
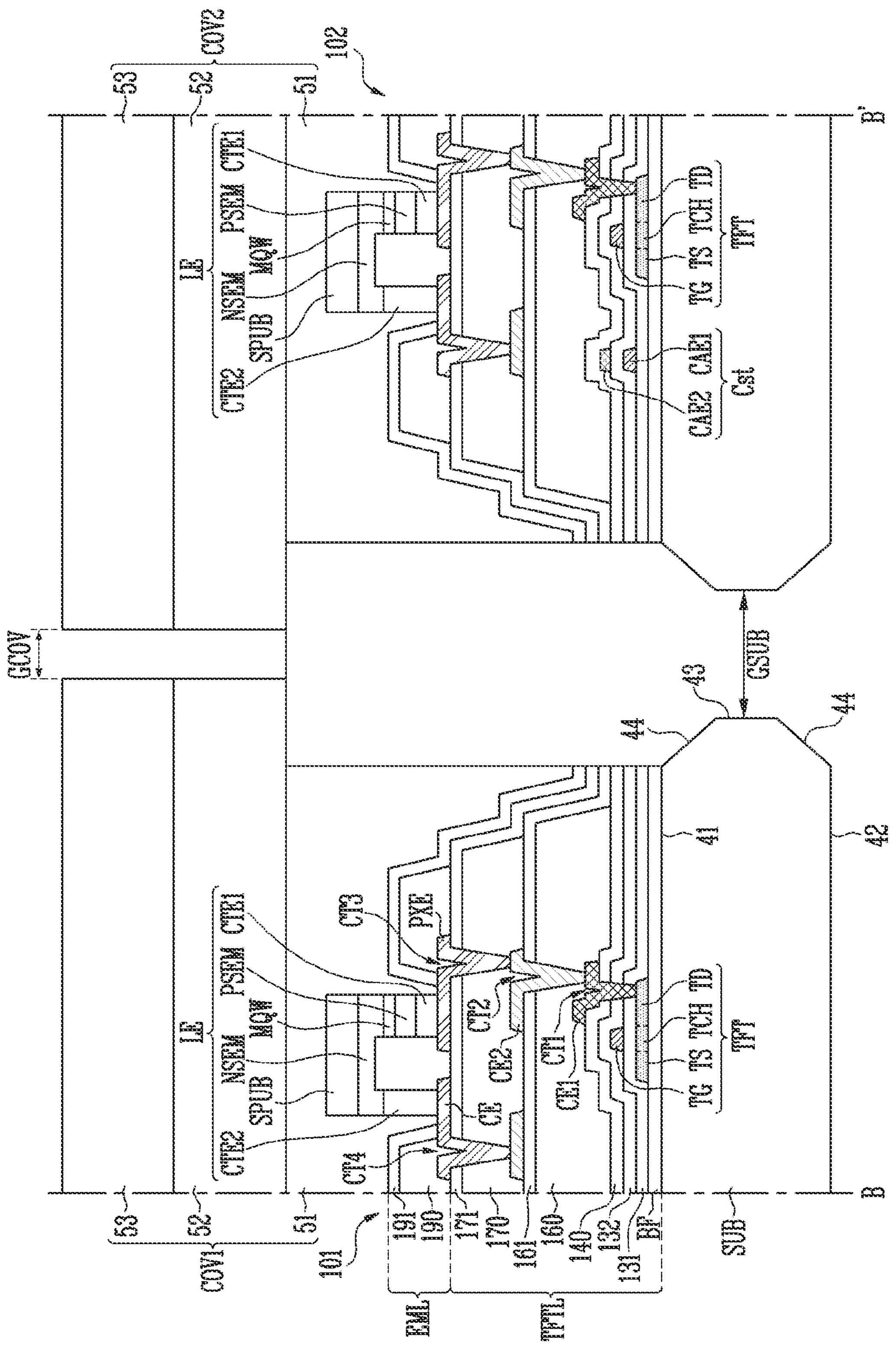
FIG. 7 is a cross-sectional view illustrating an example of the tiled display device taken along the line B-B' of FIG. 6.

FIG. 7 is a cross-sectional view illustrating an example of the tiled display device taken along the line B-B' of FIG. 6.

Referring to FIG. 7, the first display device 11 includes a first display panel 101 and a first front cover COV1. The second display device 12 includes a second display panel 102 and a second front cover COV2.

Each of the first display panel 101 and the second display panel 102 includes the substrate SUB, the thin film transistor layer TFTL, and the light emitting element layer EML. The thin film transistor layer TFTL and the light emitting element layer EML have been described above in detail with reference to FIG. 4. In the description below with reference to FIG. 7, redundant description as those with reference to FIG. 4 above may not be repeated.

The substrate SUB may include a first surface 41 on which the thin film transistor layer TFTL is disposed, a second surface 42 opposite to the first surface 41, and a first side surface 43 disposed between the first surface 41 and the second surface 42. The first surface 41 may be a front surface or an upper surface of the substrate SUB, and the second surface 42 may be a back surface or a lower surface of the substrate SUB.

In addition, the substrate SUB may further include a chamfer surface 44 disposed between the first surface 41 and the first side surface 43, and between the second surface 42 and the first side surface 43. The thin film transistor layer TFTL and the light emitting element layer EML may not be disposed on the chamfer surface 44. The chamfer surface 44 may prevent or substantially prevent the substrate SUB of the first display device 11 and the substrate of the second display device 12 from colliding with each other and becoming damaged.

The chamfer surface 44 may also be disposed between the first surface 41 and each of other side surfaces except for the first side surface 43, and between the second surface 42 and each of other side surfaces except the first side surface 43. For example, when the first display device 11 and the second display device 12 have the planar shape of the rectangle as shown in FIG. 5, the chamfer surface 44 may be disposed between the first surface 41 and each of a second side surface, a third side surface, and a fourth side surface of the substrate SUB, and may be disposed between the second surface 42 and each of the second side surface, the third side surface, and the fourth side surface of the substrate SUB.

The first front cover COV1 may be disposed on the chamfer surface 44 of the substrate SUB. In other words, the first front cover COV1 may protrude more than the substrate SUB in the first direction DR1 and the second direction DR2. Therefore, a distance GSUB between the substrate SUB of the first display device 11 and the substrate SUB of the second display device 12 may be greater than a distance GCOV between the first front cover COV1 and the second front cover COV2.

Each of the first front cover COV1 and the second front cover COV2 may include an adhesive member 51, a light transmittance control layer 52 disposed on the adhesive member 51, and an anti-glare layer 53 disposed on the light transmittance control layer 52.

The adhesive member 51 of the first front cover COV1 serves to attach the light emitting element layer EML and the first front cover COV1 of the first display panel 101 to each other. The adhesive member 51 of the second front cover COV2 serves to attach the light emitting element layer EML and the second front cover COV2 of the second display panel 102 to each other. The adhesive member 51 may be a transparent adhesive member capable of transmitting light. For example, the adhesive member 51 may be an optically clear adhesive film or an optically clear resin.

The anti-glare layer 53 may diffusely reflect external light to prevent or substantially prevent the degradation of visual recognition of an image due to reflection of the external light as it is. Accordingly, a contrast ratio of the image displayed by the first display device 11 and the second display device 12 may be increased by the anti-glare layer 53.

The light transmittance control layer 52 may reduce a transmittance of external light or light reflected from the first display panel 101 and the second display panel 102. Accordingly, a distance GSUB between the substrate SUB of the first display panel 101 and the substrate SUB of the second display panel 102 may be prevented or substantially prevented from being visually recognized from the outside.

The anti-glare layer 53 may be implemented with a polarizing plate, and the light transmittance control layer 52 may be implemented with a phase retarder layer, but the present disclosure is not limited thereto.

Cross-sections of the tiled display device taken along the lines C-C', D-D', and E-E' of FIG. 6 may be the same or substantially the same as the example of the tiled display device taken along the line B-B' described above with reference to FIG. 7, and thus, redundant description thereof are not repeated.

Figure 8:
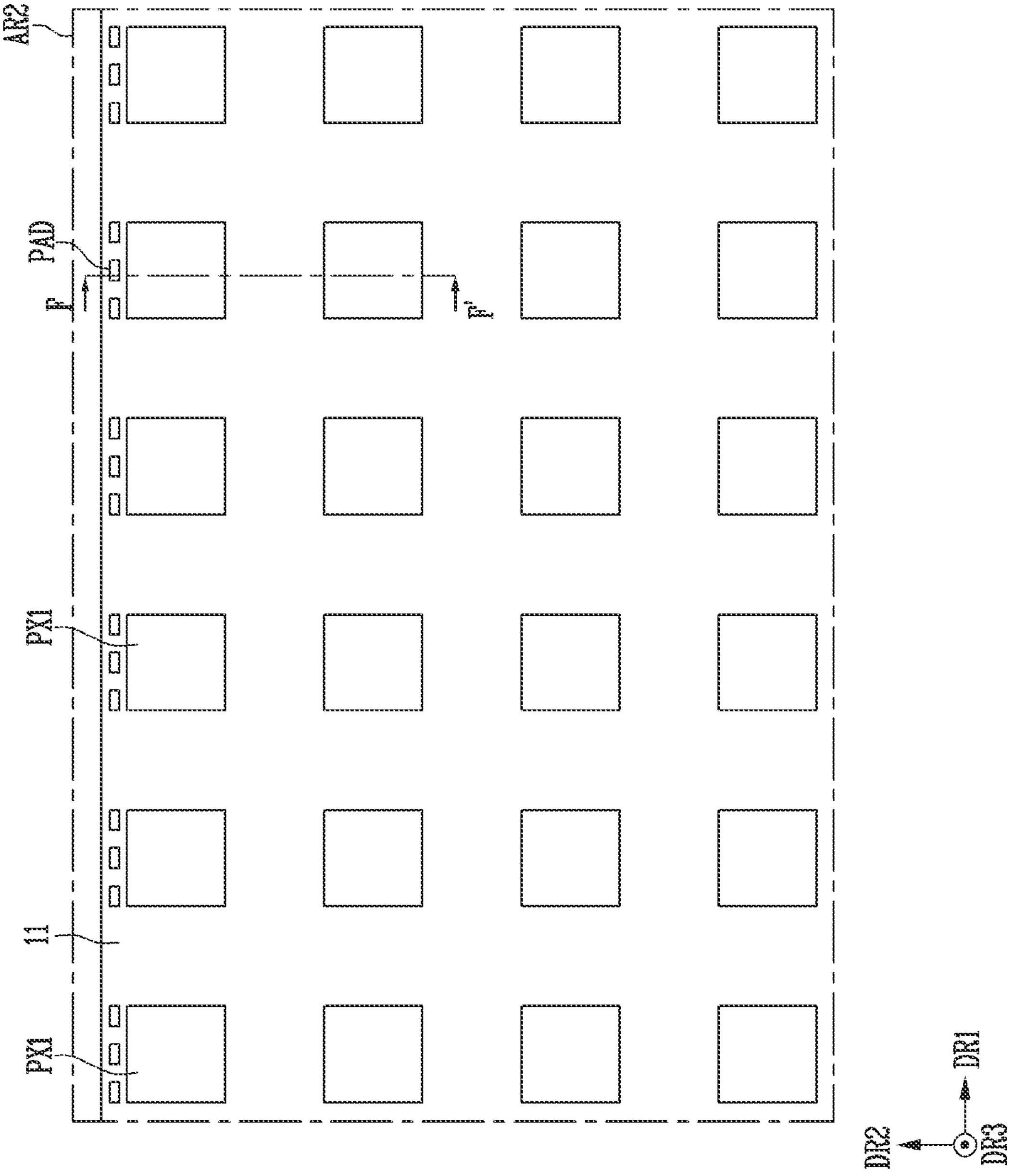
FIG. 8 is an enlarged layout diagram illustrating the area AR2 of FIG. 5 in more detail.

FIG. 8 is an enlarged layout diagram illustrating the area AR2 of FIG. 5 in more detail. In FIG. 8, pads PAD and the first pixels PX1 that are disposed on an upper side of the first display device 11 are shown.

Referring to FIG. 8, the pads PAD may be disposed on an upper edge of the first display device 11. When data lines DL of the first display device 11 extend in the second direction DR2, the pads PAD may be disposed on the upper edge and a lower edge of the first display device 11. As another example, when the data lines DL of the first display device 11 extend in the first direction DR1, the pads PAD may be disposed on a left edge and a right edge of the first display device 11.

Each of the pads PAD may be connected to a corresponding data line DL. In addition, each of the pads PAD may be connected to a corresponding side surface line SCL (e.g., refer to FIG. 9). The side surface line SCL may be disposed on one side surface and the lower surface (e.g., the back surface) of the substrate SUB. The side surface line SCL may be connected to a connection line CCL on the lower surface of the substrate SUB (e.g., refer to FIG. 9).

Figure 9:
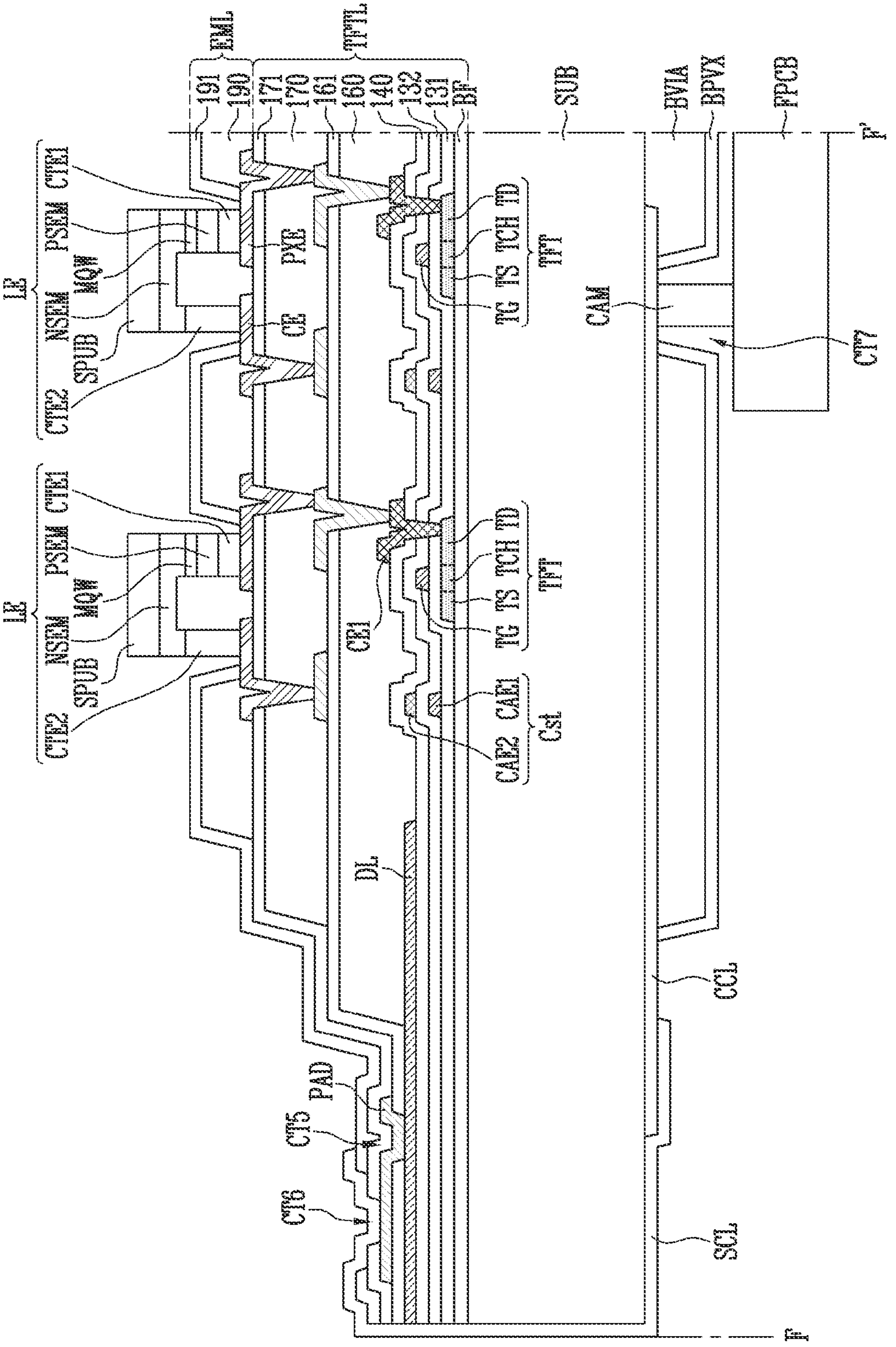
FIG. 9 is a cross-sectional view illustrating an example of the tiled display device taken along the line F-F' of FIG. 8.

FIG. 9 is a cross-sectional view illustrating an example of the tiled display device taken along the line F-F' of FIG. 8. In FIG. 9, the same reference numerals are assigned to the same or substantially the same components as those described above with reference to FIG. 4, and thus, redundant description thereof may not be repeated.

Referring to FIG. 9, the pad PAD may be disposed on the first insulating layer 161. The pad PAD may not be covered by the bank insulating layer 191, and may be exposed. The pad PAD may include the same material as that of the pixel electrodes PXE and the common electrodes CE. For example, the pad PAD may include a metal material having a high reflectance, such as a stacked structure of aluminum and titanium (e.g., Ti/Al/Ti), a stacked structure of aluminum and ITO (e.g., ITO/Al/ITO), an APC alloy, or a stacked structure of an APC alloy and ITO (e.g., ITO/APC/ITO).

The first data metal layer DTL1 may include a data line DL. The data line DL may be disposed on the interlayer insulating layer 140. In other words, the data line DL may be disposed at (e.g., in or on) the same layer as that of the first connection electrode CE1, and may include the same material as that of the first connection electrode CE1.

The pad PAD may be connected to the data line DL through a fifth contact hole CT5 passing through (e.g., penetrating) the first insulating layer 161.

The connection line CCL may be disposed on the back surface of the substrate SUB. The connecting line CCL may be a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

A back surface planarization layer BVIA may be disposed on a portion of the connection line CCL. The back surface planarization layer BVIA may be formed of an organic layer, such as an acryl resin, an epoxy resin, a phenolic resin, a polyamide resin, or a polyimide resin.

A back surface insulating layer BPVX may be disposed on the back surface planarization layer BVIA. The back surface insulating layer BPVX may be formed of an inorganic layer, for example, such as a silicon nitride layer, a silicon oxynitride layer, a silicon oxide layer, a titanium oxide layer, or an aluminum oxide layer.

The side surface line SCL may be disposed on a lower surface edge, a side surface, and an upper surface edge of the substrate SUB. One end of the side surface line SCL may be connected to the connection line CCL. The one end of the side surface line SCL may contact a side surface and a lower surface of the connection line CCL. Another end of the side surface line SCL may be connected to the pad portion PAD. The other end of the side surface line SCL may be connected to the pad portion PAD through a sixth contact hole CT6 passing through (e.g., penetrating) the bank insulating layer 191.

The side surface line SCL may be disposed on the side surface of the substrate SUB, a side surface of the buffer layer BF, a side surface of the first gate insulating layer 131, a side surface of the second gate insulating layer 132, a side surface of the interlayer insulating layer 140, a side surface of the first insulating layer 161, and a side surface of the second insulating layer 171.

A flexible film FPCB may be disposed on a lower surface of the back surface insulating layer BPVX. The flexible film FPCB may be connected to the connection line CCL through a seventh contact hole CT7 passing through (e.g., penetrating) the back surface planarization layer BVIA and the back surface insulating layer BPVX using a conductive adhesive member CAM. A source driving circuit for supplying data voltages to the data lines DL may be disposed on a lower surface of the flexible film FPCB. The conductive adhesive member CAM may be an anisotropic conductive film or an anisotropic conductive paste.

As shown in FIGS. 8 and 9, in the first display device 11, the source driving circuit of the flexible film FPCB disposed under (e.g., underneath) the substrate SUB may be connected to the data line DL through the connection line CCL, the side surface line SCL, and the pad PAD. In other words, because the source driving circuit is disposed on the substrate SUB, a non-display area NDA may be eliminated or reduced, and thus, the pixels PX may also be formed at the edge of the substrate SUB.

Figure 10:
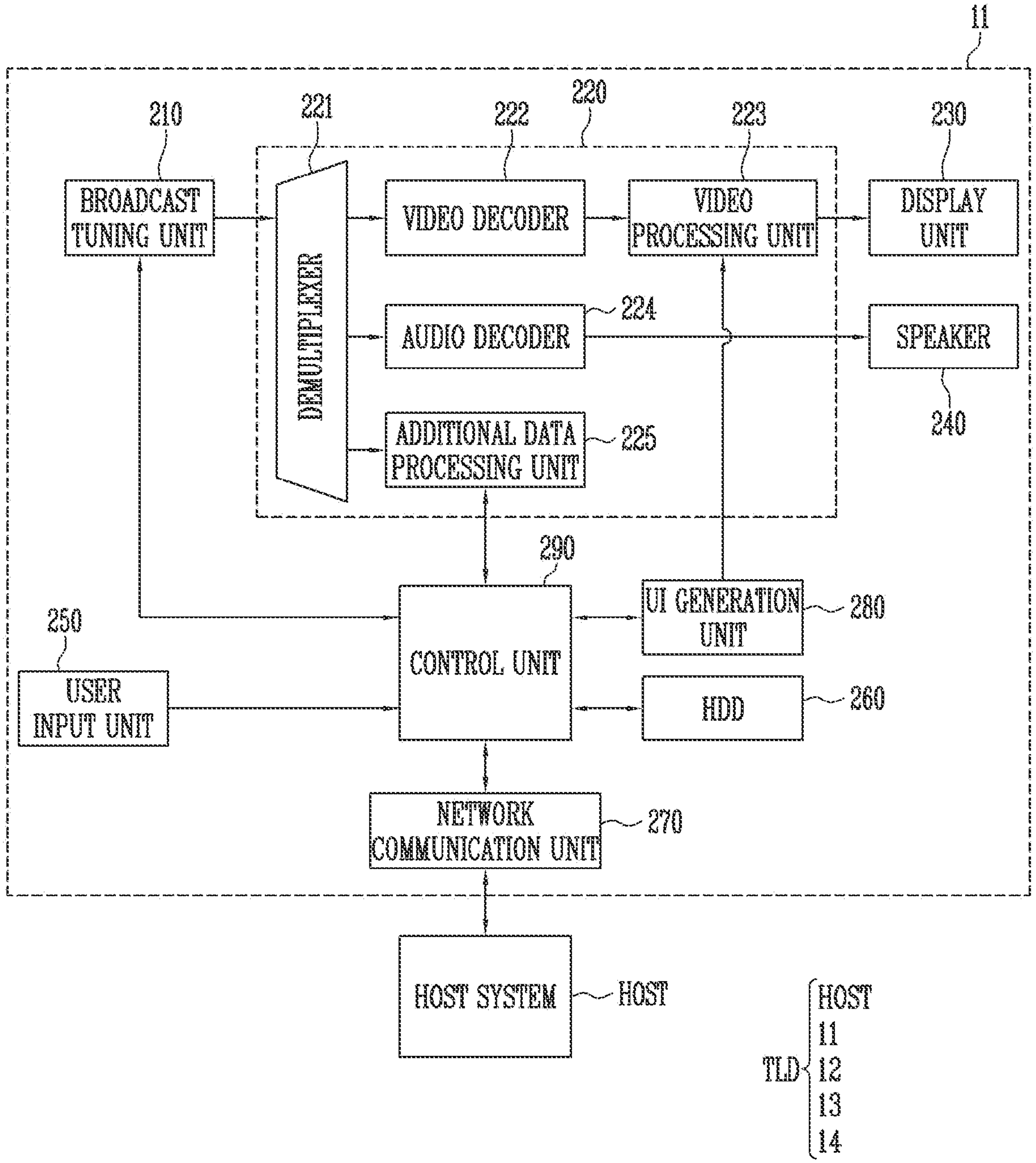
FIG. 10 is a block diagram illustrating a tiled display device according to an embodiment.

FIG. 10 is a block diagram illustrating a tiled display device according to an embodiment.

In FIG. 10, the first display device 11 and a host system HOST are shown for convenience of illustration.

Referring to FIG. 10, the tiled display device TLD according to an embodiment may include the host system HOST, and the plurality of display devices 11, 12, 13, and 14.

The host system HOST may be implemented as any suitable one of a television system, a home theater system, a set-top box, a navigation system, a DVD player, a Blu-ray player, a personal computer (PC), a mobile phone system, and a tablet.

A user's instruction may be input to the host system HOST in various suitable formats. For example, an instruction by a user's touch input may be input to the host system HOST. As another example, a user's instruction may be input to the host system HOST by a keyboard input, or a button input of a remote controller.

The host system HOST may receive original video data corresponding to an original image from the outside. The host system HOST may divide the original video data by the number of display devices of the tiled display device TLD. For example, the host system HOST may divide the original video data into first video data corresponding to a first image, second video data corresponding to a second image, third video data corresponding to a third image, and fourth video data corresponding to a fourth image, in response to the tiled display device TLD including the first display device 11, the second display device 12, the third display device 13, and the fourth display device 14. The host system HOST may transmit the first video data to the first display device 11, the second video data to the second display device 12, the third video data to the third display device 13, and the fourth video data to the fourth display device 14.

The first display device 11 may display the first image according to the first video data, the second display device 12 may display the second image according to the second video data, the third display device 13 may display the third image according to the third video data, and the fourth display device 14 may display the fourth image according to the fourth video data. Accordingly, the user may view the original image through a combination of the first to fourth images displayed on the first to fourth display devices 11, 12, 13 and 14.

For example, the first display device 11 may include a broadcast tuning unit (e.g., a broadcast tuner) 210, a signal processing unit (e.g., a signal processor) 220, a display unit (e.g., a display or a touch-display) 230, a speaker 240, a user input unit (e.g., a user input sensor or device) 250, an HDD 260, a network communication unit (e.g., a network communication device) 270, a UI generation unit (e.g., a user interface generator) 280, and a control unit (e.g., a controller) 290.

The broadcast tuning unit 210 may tune a channel frequency (e.g., a predetermined channel frequency) under control of the control unit 290, and may receive a broadcast signal of a corresponding channel through an antenna. The broadcast tuning unit 210 may include a channel detection module (e.g., a channel detector) and an RF demodulation module (e.g., an RF demodulator).

A broadcast signal demodulated by the broadcast tuning unit 210 is processed by the signal processing unit 220, and output to the display unit 230 and the speaker 240. Here, the signal processing unit 220 may include a demultiplexer 221, a video decoder 222, a video processing unit (e.g., a video processor) 223, an audio decoder 224, and an additional data processing unit (e.g., an additional data processor) 225.

The demultiplexer 221 divides the demodulated broadcast signal into a video signal, an audio signal, and additional data. The divided video signal, audio signal, and additional data are restored by the video decoder 222, the audio decoder 224, and the additional data processing unit 225, respectively. The video decoder 222, the audio decoder 224, and the additional data processing unit 225 restore the divided video signal, audio signal, and additional data according to a decoding format corresponding to an encoding format when the broadcast signal was transmitted.

A decoded video signal is converted by the video processing unit 223 to fit a vertical frequency, a resolution, a screen ratio, and the like corresponding to an output standard of the display unit 230, and a decoded audio signal is output to the speaker 240.

The display unit 230 may include a display panel 100 on which an image is displayed, and a panel driver for controlling the driving of the display panel 100. A more detailed block diagram of the display panel 100 and the panel driver is described below with reference to FIG. 11.

The user input unit 250 may receive a signal transmitted from the host system HOST. The user input unit 250 may receive data for selection and input of an instruction related to communication with other display devices by the user, as well as data related to selection of a channel transmitted by the host system HOST, and selection and manipulation of a user interface (UI) menu.

The HDD 260 stores various software programs including an OS program, a recorded broadcast program, a moving picture, a photo, and other data, and may be formed of a storage medium, for example, such as a hard disk or non-volatile memory.

The network communication unit 270 may be used for short-range communication with the host system HOST and the other display devices, and may be implemented with a communication module (e.g., a communication device) including an antenna pattern that may implement mobile communication, data communication, Bluetooth, RF, Ethernet, and the like.

The network communication unit 270 may transmit and receive a wireless signal with at least one of a base station, an external terminal, and a server on a mobile communication network built according to technical standards, or a communication method (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 5G, or the like) for mobile communication through an antenna pattern described in more detail below.

The network communication unit 270 may transmit and receive a wireless signal in a communication network according to wireless Internet technologies through the antenna pattern. The wireless Internet technologies may include, for example, wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like, and the antenna pattern transmits and receives data according to at least one wireless Internet technology within a range including an Internet technology which is not listed above.

The UI generation unit 280 generates a UI menu for communication with the host system HOST and the other display devices, and may be implemented by an algorithm code and an OSD IC. The UI menu for communication with the host system HOST and the other display devices may be a menu for designating a counterpart digital TV for communication and selecting a desired function.

The control unit 290 is in charge of the overall control of the first display device 11, and is in charge of communication control of the host system HOST and the second to fourth display devices 12, 13, and 14. A corresponding algorithm code for control is stored, and the control unit 290 may be implemented by a micro controller unit (MCU) in which the stored algorithm code is executed.

The control unit 290 transmits a corresponding control instruction and data to the host system HOST and the second to fourth display devices 12, 13, and 14 through the network communication unit 270 according to an input and selection of the user input unit 250. When a control instruction (e.g., a predetermined control instruction) and data are input from the host system HOST and the second to fourth display devices 12, 13, and 14, an operation is performed according to the corresponding control instruction.

A block diagram of the second display device 12, a block diagram of the third display device 13, and a block diagram of the fourth display device 14 are the same or substantially the same as the block diagram of the first display device 11 described with reference to FIG. 10, and thus, redundant description thereof is not repeated.

Figure 11:
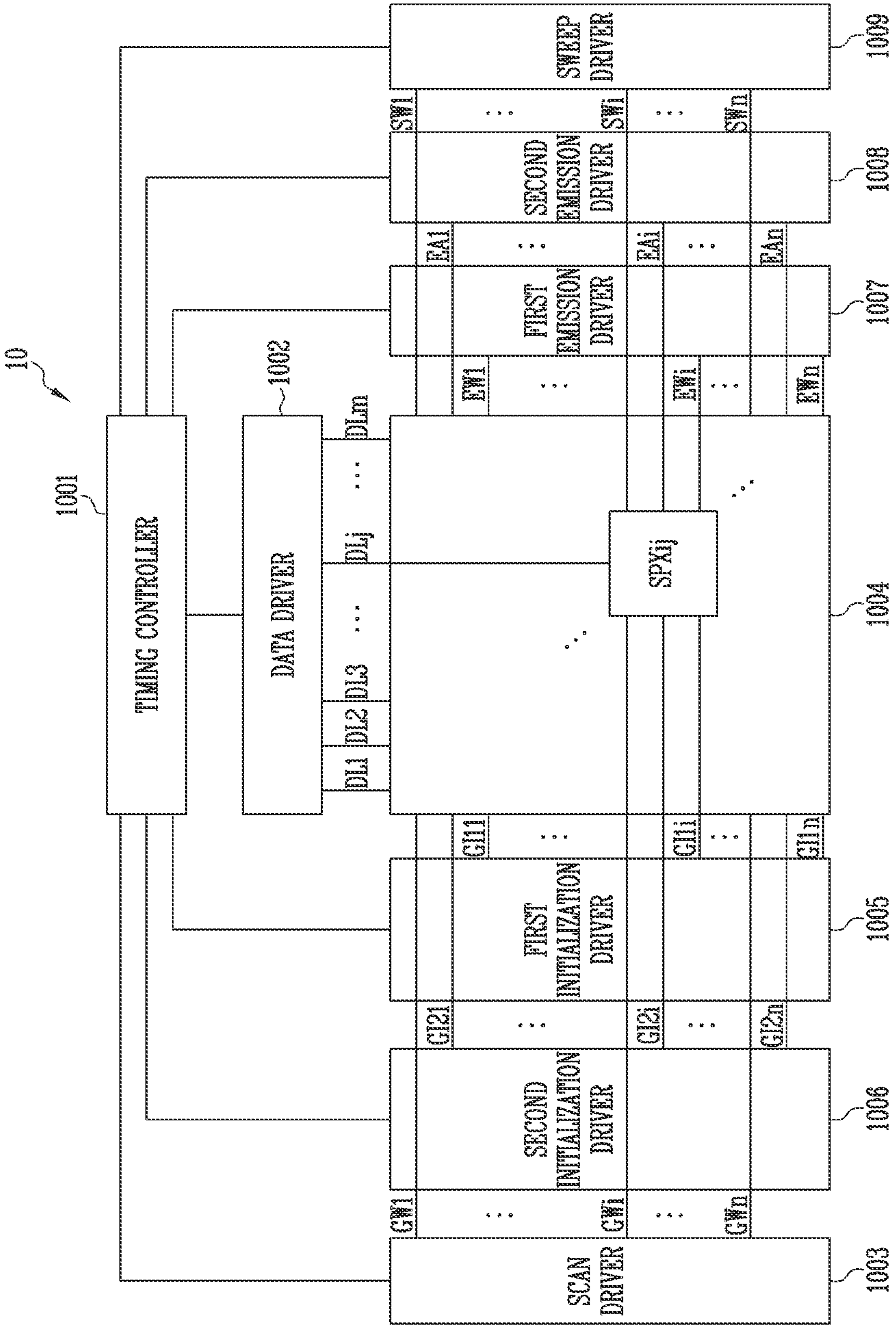
FIG. 11 is a block diagram illustrating a display device according to an embodiment.

FIG. 11 is a block diagram illustrating a display device according to an embodiment. Referring to FIG. 11, the display device 10 may include a timing controller 1001, a data driver 1002, a scan driver 1003, a pixel unit (e.g., a display panel or a display layer) 1004, a first initialization driver 1005, a second initialization driver 1006, a first emission driver 1007, a second emission driver 1008, and a sweep driver 1009. The above-described display panel 100 may correspond to the pixel unit 1004. In addition, the above-described panel driver may correspond to the timing controller 1001, the data driver 1002, the scan driver 1003, the first initialization driver 1005, the second initialization driver 1006, the first emission driver 1007, the second emission driver 1008, and the sweep driver 1009. The panel driver may be configured of one integrated chip (IC) or a plurality of chips. However, in some embodiments, at least a portion of the panel driver may not be configured of a chip, and may be formed on the substrate SUB.

The timing controller 1001 may receive grayscales (e.g., grayscale values) for an image frame and control signals from a processor. The processor may be an application processor, a central processing unit (CPU), a graphics processing unit (GPU), or the like of the display device 10. The processor may be the signal processing unit 220 (e.g., refer to FIG. 10). The grayscales may include first grayscales for a first color, second grayscales for a second color, and third grayscales for a third color.

The timing controller 1001 may convert input grayscales into output grayscales according to a structure (e.g., an RGB stripe structure, a PENTILE® structure, or the like, PENTILE® being a duly registered trademark of Samsung Display Co., Ltd.) and a characteristic (e.g., a threshold voltage of a driving transistor, mobility, a deterioration degree of a light emitting element, or the like) of the pixel unit 1004. According to an embodiment, the timing controller 1001 may provide the output grayscales as the same or substantially the same as the input grayscales, without converting the input grayscales. The timing controller 1001 may provide the output grayscales and the control signals to the data driver 1002. In addition, the timing controller 1001 may provide a clock signal, a start signal, and the like to the scan driver 1003, the first initialization driver 1005, the second initialization driver 1006, the first emission driver 1007, the second emission driver 1008, and the sweep driver 1009.

The data driver 1002 may generate data voltages to be provided to data lines DL1, DL2, DL3, . . . , DLj, . . . , and DLm using the output grayscales and the control signals received from the timing controller 1001, where m is an integer greater than 0. For example, the data driver 1002 may sample the output grayscales using the clock signal, and may apply the data voltages corresponding to the output grayscales to the data lines DL1 to DLm in a pixel row unit (e.g., in a unit of a pixel row).

The scan driver 1003 may receive the clock signal, the start signal, and the like from the timing controller 1001 to generate scan signals to be provided to scan lines GW1, . . . , GWi, . . . , and GWn, where n is an integer greater than 0. For example, the scan driver 1003 may sequentially provide the scan signals having a pulse of a turn-on level to the scan lines GW1 to GWn. For example, the scan driver 1003 may be configured in a form of a shift register, and may generate the scan signals in a method of sequentially transmitting the start signal, which is a turn-on level of a pulse form, to a next stage circuit according to control of the clock signal.

The first initialization driver 1005 may receive the clock signal, the start signal, and the like from the timing controller 1001 to generate first initialization signals to be provided to first initialization lines GI11, . . . , GI1i, . . . , and GI1n. For example, the first initialization driver 1005 may sequentially provide the first initialization signals having a turn-on level of a pulse to the first initialization lines GI11 to GI1n. For example, the first initialization driver 1005 may be configured in a form of a shift register, and may generate the first initialization signals in a method of sequentially transmitting the start signal, which is a turn-on level of a pulse form, to a next stage circuit according to control of the clock signal.

The second initialization driver 1006 may receive the clock signal, the start signal, and the like from the timing controller 1001 to provide second initialization signals to be provided to second initialization lines GI21, . . . , GI2i, . . . , and GI2n. For example, the second initialization driver 1006 may sequentially provide the second initialization signals having a turn-on level of a pulse to the second initialization lines GI21 to GI2n. For example, the second initialization driver 1006 may be configured in a form of a shift register, and may generate the second initialization signals in a method of sequentially transmitting the start signal, which is a turn-on level of a pulse form, to a next stage circuit according to control of the clock signal.

The first emission driver 1007 may receive the clock signal, the start signal, and the like from the timing controller 1001 to generate first emission signals to be provided to first emission lines EW1, . . . , EWi, . . . , and EWn. For example, the first emission driver 1007 may sequentially provide the first emission signals having a turn on level of a pulse to the first emission lines EW1 to EWn. For example, the first emission driver 1007 may be configured in a form of a shift register, and may generate the first emission signals in a method of sequentially transmitting the start signal, which is a turn-on level of a pulse form, to a next stage circuit according to control of the clock signal.

The second emission driver 1008 may receive the clock signal, the start signal, and the like from the timing controller 1001 to generate the second emission signals to be provided to second emission lines EA1, . . . , EAi, . . . , and EAn. For example, the second emission driver 1008 may sequentially provide the second emission signals having a turn-on level of pulses to the second emission lines EA1 to EAn. For example, the second emission driver 1008 may be configured in a form of a shift register, and may generate the second emission signals in a method of sequentially transmitting the start signal, which is a turn-on level of a pulse form, to a next stage circuit according to control of the clock signal.

The sweep driver 1009 may receive the clock signal, the start signal, and the like from the timing controller 1001 to generate sweep signals to be provided to sweep lines SW1, . . . , SWi, . . . , and SWn. For example, the sweep driver 1009 may sequentially provide the sweep signals to the sweep lines SW1 to SWn. The sweep signals may be signals that change linearly over time. For example, the sweep signals may be voltage signals that gradually decrease. For example, the sweep driver 1009 may be configured in a form of a shift register, and may generate the sweep signals in a method of sequentially transmitting a carry signal to a next stage circuit according to control of the clock signal.

The pixel unit 1004 includes the pixels. As described above, each pixel may include the first sub-pixel, the second sub-pixel, and the third sub-pixel. For example, a sub-pixel SPXij may be connected to the data line DLj, the scan line GWi, the first initialization line GI1i, the second initialization line GI2i, the first emission line EWi, the second emission line EAi, and the sweep line SWi corresponding thereto. Here, i and j may be integers greater than 0.

Each of the first sub-pixels may include the first light emitting element of the first color. Each of the second sub-pixels may include the second light emitting element of the second color. Each of the third sub-pixels may include the third light emitting element of the third color. The first color, the second color, and the third color may be different colors from one another. For example, the first color may be one of red, green, and blue, the second color may be one of red, green, and blue other than the first color, and the third color may be the remaining one of red, green, and blue other than the first color and the second color. In addition, magenta, cyan, and yellow may be used as the first to third colors, instead of red, green, and blue. However, in the present embodiment, for convenience, the first color is described as red, the second color is described as green, and the third color is described as blue.

The first sub-pixels may be commonly connected to a first global data line. For example, even first sub-pixels that are connected to different data lines DL1 to DLm from each other may be connected to the same first global data line. Similarly, the second sub-pixels may be commonly connected to a second global data line. The third sub-pixels may be commonly connected to a third global data line. A first global data voltage supplied to the first global data line, a second global data voltage supplied to the second global data line, and a third global data voltage supplied to the third global data line may be different from each other. For example, the first global data voltage, the second global data voltage, and the third global data voltage may be different (e.g., may be set differently) from each other in consideration of a capacitance, a threshold voltage, an emission delay time, and the like of the light emitting element of each color.

The sub-pixels of the pixel unit 1004 may be disposed in various suitable forms, for example, such as in a diamond PENTILE®, RGB-Stripe, S-stripe, Real RGB, or normal PENTILE®.

Figure 12:
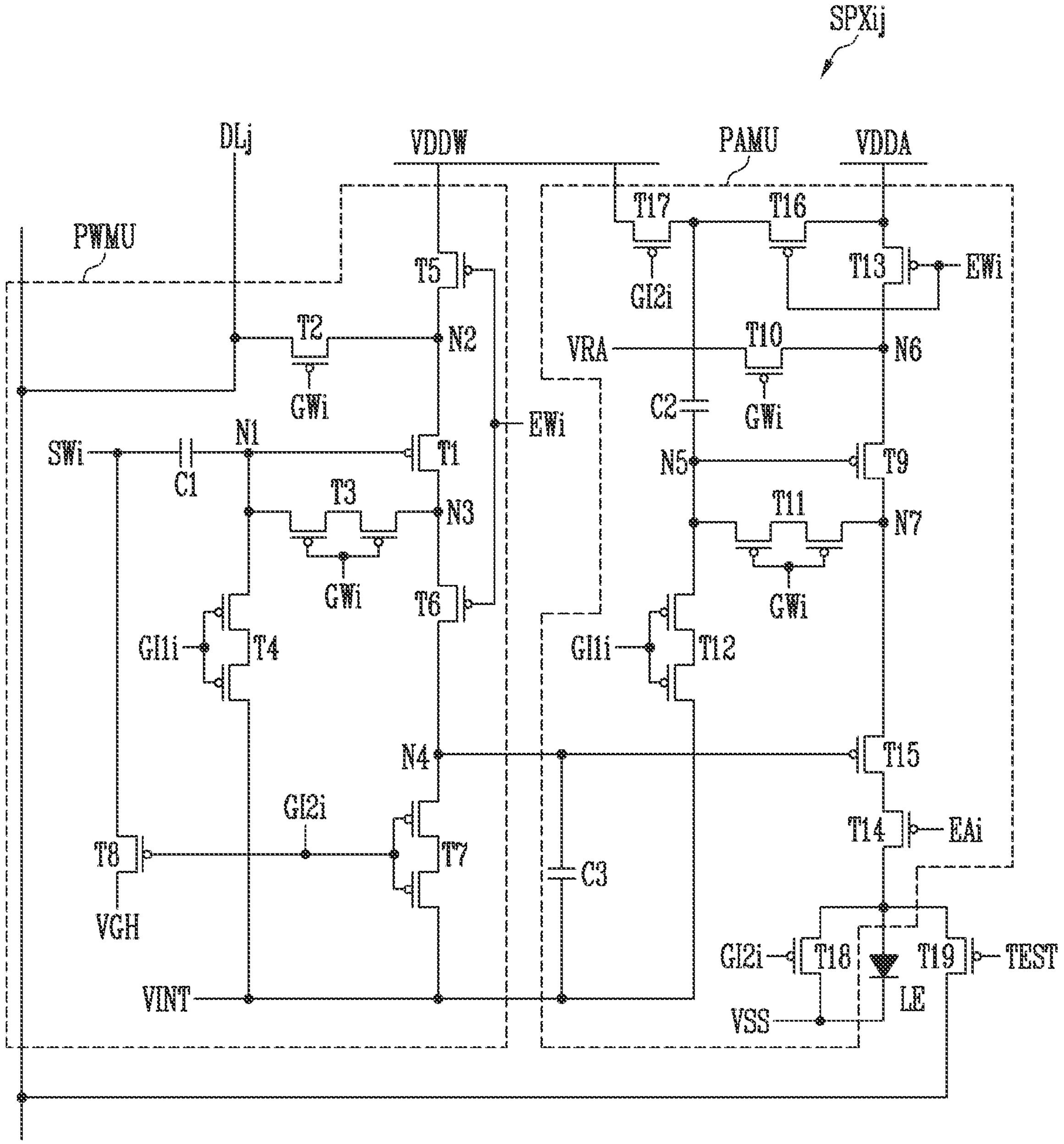
FIG. 12 is a diagram illustrating a pixel circuit according to an embodiment.

FIG. 12 is a diagram illustrating a pixel circuit according to an embodiment.

Referring to FIG. 12, the sub-pixel SPXij according to an embodiment of the present disclosure may include a first circuit unit (e.g., a first circuit) PAMU, a second circuit unit (e.g., a second circuit) PWMU, a light emitting element LE, and a test transistor T19. Hereinafter, for convenience, the sub-pixel SPXij is described in more detail in the context of the first sub-pixel of the first color.

The light emitting element LE may be an inorganic light emitting element having an inorganic semiconductor. For example, the light emitting element LE may be a flip chip type of a micro light emitting diode element. In another embodiment, the light emitting element LE may be configured of an organic light emitting diode, a quantum dot light emitting diode, or the like. In addition, although only one light emitting element LE is shown in FIG. 12, the light emitting element LE may be configured of a plurality of ultra-small light emitting elements. For example, the plurality of ultra-small light emitting elements may be connected in series, parallel, or series-parallel.

The first circuit unit PAMU may supply a driving current to the light emitting element LE based on the first global data voltage received from the first global data line VRA. The first circuit unit PAMU may be a pulse amplitude modulation (PAM) circuit unit (e.g., a PAM circuit). Because different global data voltages may be supplied to sub-pixels of different colors from each other, a magnitude of the driving current generated by the first circuit unit PAMU may be different for different colors (e.g., for each color).

The second circuit unit PWMU may control a supply period of the driving current based on a data voltage received from the data line DLj. The second circuit unit PWMU may be a pulse width modulation (PWM) circuit unit (e.g., a PWM circuit). When the supply period of the driving current is shortened, the emission period of the sub-pixel SPXij is shortened, and thus, a luminance of the sub-pixel SPXij may decrease. When the supply period of the driving current is lengthened, the emission period of the sub-pixel SPXij is lengthened, and thus, the luminance of the sub-pixel SPXij may increase.

The test transistor T19 may have a first electrode connected to an anode of the light emitting element LE, and a second electrode connected to the data line DLj. A gate electrode of the test transistor T19 may be connected to a test line TEST.

The transistors may be configured as P-type transistors. In another embodiment, the transistors may be configured as N-type transistors. In another embodiment, the transistors may be configured as a combination of an N-type transistor and a P-type transistor. The P-type transistor refers to a transistor in which an amount of conducting current increases, when a voltage difference between a gate electrode and a source electrode thereof increases in a negative direction. The N-type transistor refers to a transistor in which an amount of conducting current increases, when a voltage difference between a gate electrode and a source electrode thereof increases in a positive direction. The transistor may be configured in various suitable forms, such as a thin film transistor (TFT), a field effect transistor (FET), and/or a bipolar junction transistor (BJT).

The second circuit unit PWMU may include first to eighth transistors T1 to T8, and a first capacitor C1.

The first transistor T1 may have a gate electrode connected to a first node N1, a first electrode connected to a second node N2, and a second electrode connected to a third node N3. The second transistor T2 may have a gate electrode connected to the scan line GWi, a first electrode connected to the data line DLj, and a second electrode connected to the second node N2. The third transistor T3 may have a gate electrode connected to the scan line GWi, a first electrode connected to the first node N1, and a second electrode connected to the third node N3. The fourth transistor T4 may have a gate electrode connected to the first initialization line GI1i, a first electrode connected to the first node N1, and a second electrode connected to a first voltage line VINT. The first capacitor C1 may have a first electrode connected to the sweep line SWi, and a second electrode connected to the first node N1. The fifth transistor T5 may have a gate electrode connected to the first emission line EWi, a first electrode connected to a second voltage line VDDW, and a second electrode connected to the second node N2. The sixth transistor T6 may have a gate electrode connected to the first emission line EWi, a first electrode connected to the third node N3, and a second electrode connected to a fourth node N4. The seventh transistor T7 may have a gate electrode connected to the second initialization line GI2i, a first electrode connected to the fourth node N4, and a second electrode connected to the first voltage line VINT. The eighth transistor T8 may have a gate electrode connected to the second initialization line GI2i, a first electrode connected to the sweep line SWi, and a second electrode connected to a third voltage line VGH. For example, each of the third transistor T3, the fourth transistor T4, and the seventh transistor T7 may include series-connected sub-transistors. Accordingly, a leakage current of the first node N1 and the fourth node N4 may be prevented or substantially prevented from occurring.

The first circuit unit PAMU may include ninth to eighteenth transistors T9 to T18, a second capacitor C2, and a third capacitor C3.

The ninth transistor T9 may have a gate electrode connected to a fifth node N5, a first electrode connected to a sixth node N6, and a second electrode connected to a seventh node N7. The tenth transistor T10 may have a gate electrode connected to the scan line GWi, a first electrode connected to the first global data line VRA, and a second electrode connected to the sixth node N6. The eleventh transistor T11 may have a gate electrode connected to the scan line GWi, a first electrode connected to the fifth node N5, and a second electrode connected to the seventh node N7. The twelfth transistor T12 may have a gate electrode connected to the first initialization line GI1i, a first electrode connected to the fifth node N5, and a second electrode connected to the first voltage line VINT. The thirteenth transistor T13 may have a gate electrode connected to the first emission line EWi, a first electrode connected to a first power line VDDA, and a second electrode connected to the sixth node N6. The fourteenth transistor T14 may have a gate electrode connected to the second emission line EAi, a first electrode connected to a second electrode of the fifteenth transistor T15, and a second electrode connected to the anode of the light emitting element LE. The fifteenth transistor T15 may have a gate electrode connected to the fourth node N4, a first electrode connected to the seventh node N7, and the second electrode connected to the first electrode of the fourteenth transistor T14. The second capacitor C2 may include a first electrode, and a second electrode of the second capacitor C2 may be connected to the fifth node N5. The sixteenth transistor T16 may have a gate electrode connected to the first emission line EWi, a first electrode connected to the first electrode of the second capacitor C2, and a second electrode connected to the first power line VDDA. The seventeenth transistor T17 may have a gate electrode connected to the second initialization line GI2i, a first electrode connected to the second voltage line VDDW, and a second electrode connected to the first electrode of the second capacitor C2. The third capacitor C3 may have a first electrode connected to the fourth node N4, and a second electrode connected to the first voltage line VINT. The eighteenth transistor T18 may have a gate electrode connected to the second initialization line GI2i, a first electrode connected to the anode of the light emitting element LE, and a second electrode connected to a second power line VSS. For example, each of the eleventh transistor T11 and the twelfth transistor T12 may include series-connected sub-transistors. Accordingly, a leakage current of the fifth node N5 may be prevented or substantially prevented from occurring.

Figure 13:
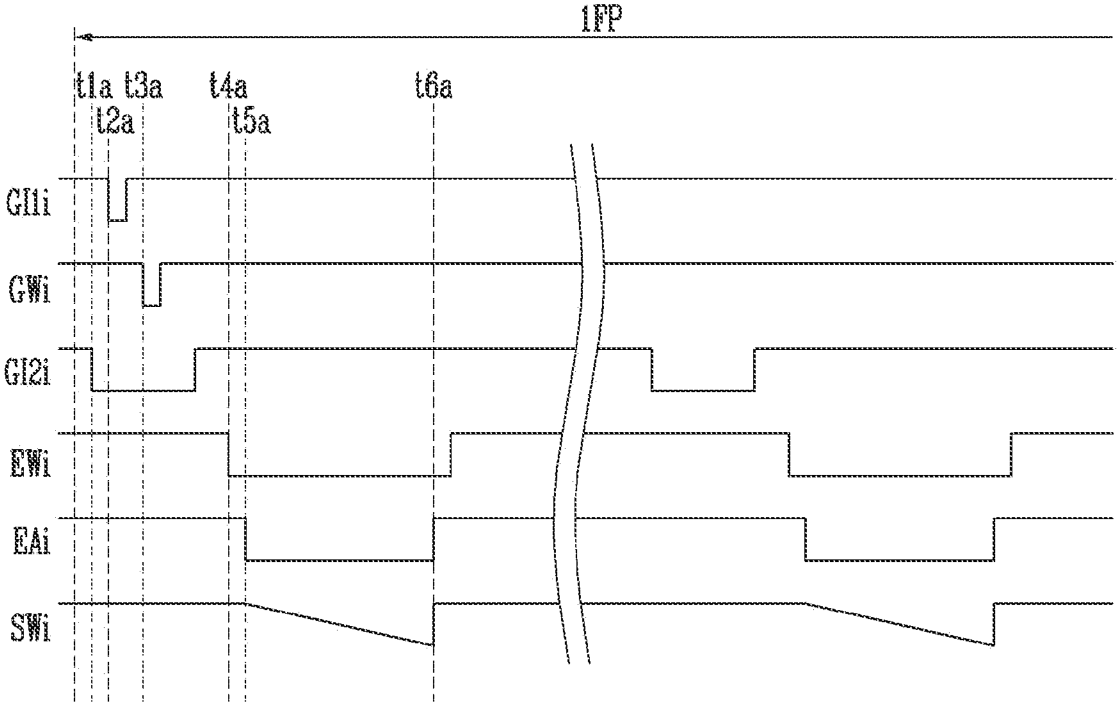
FIG. 13 is a diagram illustrating a driving method of the pixel circuit of FIG. 12.

FIG. 13 is a diagram illustrating a driving method of the pixel circuit of FIG. 12. The driving method of the sub-pixel SPXij is described in more detail based on one frame period 1FP with reference to FIG. 13.

First, at a time point t1a, a second initialization signal of a turn-on level (e.g., a logic low level) may be applied to the second initialization line GI2i. Accordingly, a voltage of the fourth node N4 may have (e.g., may be set to) a voltage of the first voltage line VINT through the turned on seventh transistor T7. For example, the voltage of the first voltage line VINT is at a logic low level, and thus, the fifteenth transistor T15 may be turned on. The voltage of the fourth node N4 may be supported by the third capacitor C3. In addition, an end voltage (e.g., a both end voltage) of the light emitting element LE may have (e.g., may be set to) a voltage of the second power line VSS through the turned on eighteenth transistor T18. Accordingly, a black expression of the light emitting element LE may be improved.

Next, at a time point t2a, a first initialization signal of a turn-on level (e.g., a logic low level) may be applied to the first initialization line GI1i. A voltage (e.g., a both end voltage) of the first capacitor C1 may be set by the fourth transistor T4 and the eighth transistor T8 that are turned on. For example, the both end voltage of the first capacitor C1 may correspond to a voltage difference between a voltage of the third voltage line VGH and a voltage of the first voltage line VINT. At this time, the first transistor T1 may be turned on by the voltage of the first node N1. In addition, a voltage (e.g., a both end voltage) of the second capacitor C2 may be set by the twelfth transistor T12 and the seventeenth transistor T17 that are turned on. For example, the both end voltage of the second capacitor C2 may correspond to a voltage difference between a voltage of the second voltage line VDDW and the voltage of the first voltage line VINT. At this time, the ninth transistor T9 may be turned on by the voltage of the fifth node N5.

Next, at a time point t3a, a scan signal of a turn-on level (e.g., a logic low level) may be applied to the scan line GWi. Therefore, the second transistor T2, the third transistor T3, the tenth transistor T10, and the eleventh transistor T11 may be turned on. At this time, the data voltage of the data line DLj is applied to the first node N1 through the second transistor T2, the first transistor T1, and the third transistor T3 that are turned on. Thus, the voltage of the first node N1 is a compensation voltage in which a threshold voltage of the first transistor T1 is reflected. In addition, the first global data voltage of the first global data line VRA is applied to the fifth node N5 through the tenth transistor T10, the ninth transistor T9, and the eleventh transistor T11 that are turned on. At this time, a voltage of the fifth node N5 is a compensation voltage in which a threshold voltage of the ninth transistor T9 is reflected. Therefore, a deviation of the threshold voltage due to a process deviation of the first transistor T1 and the ninth transistor T9 may be compensated for.

Next, at a time point t4a, a first emission signal of a turn-on level (e.g., a logic low level) may be applied to the first emission line EWi. Therefore, the fifth transistor T5, the sixth transistor T6, and the thirteenth transistor T13 may be turned on.

Next, at a time point t5a, a second emission signal of a turn-on level (e.g., a logic low level) may be applied to the second emission line EAi. Accordingly, the fourteenth transistor T14 is turned on, and the driving current sequentially flows through the first power line VDDA, the thirteenth transistor T13, the ninth transistor T9, the fifteenth transistor T15, the fourteenth transistor T14, the light emitting element LE, and the second power line VSS. Accordingly, the light emitting element LE may emit light having a desired luminance corresponding to an amount of the driving current.

At the time point t5a, a voltage of a sweep signal of the sweep line SWi may gradually decrease. At this time, due to coupling of the first capacitor C1, the voltage of the first node N1 also gradually decreases. As the voltage of the first node N1 at the time point t3a increases, a time point at which the first transistor T1 is turned on may be delayed. As the voltage of the first node N1 at the time t3a decreases, the time point at which the first transistor T1 is turned on may be earlier. When the first transistor T1 is turned on during a period from t5a to t6a, a voltage of the fourth node N4 may have (e.g., may be set to) a voltage (e.g., a logic high level) of the second voltage line VDDW. Accordingly, the fifteenth transistor T15 is turned off, and supply of the driving current flowing to the light emitting element LE is stopped. As a stop time point of the driving current is earlier, a luminance of the sub-pixel SPXij that may be visually recognized with respect to a corresponding frame period 1FP may decrease. On the other hand, as the stop time point of the driving current is delayed, the luminance of the sub-pixel SPXij that may be visually recognized with respect to the corresponding frame period 1FP may increase.

When the sub-pixel SPXij emits light with a full-white grayscale (e.g., a full-while grayscale level) in the frame period 1FP, at a time point t6a, a second light emitting signal of a turn-off level is applied to the second emission line EAi, and the fourteenth transistor T14 may be turned off, and thus, the supply of the driving current may be stopped. According to an embodiment, the second initialization signal, the first emission signal, the second emission signal, and the sweep signal may be repeatedly provided after the time point t6a of the corresponding frame period 1FP. Accordingly, a desired luminance waveform of the sub-pixel SPXij may be provided.

Next, an electrical test method of the sub-pixel SPXij of FIG. 12 is described in more detail.

Because the second circuit unit PWMU is connected to the independent data line DLj, electrically testing for determining whether the transistors T1 to T8 normally operate may be performed. For example, it may be checked whether the second transistor T2 and the fifth transistor T5 are normally operating, by setting the second transistor T2 and the fifth transistor T5 to a turn-on state, and checking whether a voltage of the data line DLj has (e.g., is set to) the voltage of the second voltage line VDDW. Similarly, it may be checked whether the second transistor T2, the first transistor T1, the third transistor T3, and the fourth transistor T4 are normally operating, by setting the second transistor T2, the first transistor T1, the third transistor T3, and the fourth transistor T4 to a turn-on state, and checking whether the voltage of the data line DLj has (e.g., is set to) the voltage of the first voltage line VINT. Similarly, it may be checked whether the second transistor T2, the first transistor T1, the sixth transistor T6, and the seventh transistor T7 are normally operating, by setting the second transistor T2, the first transistor T1, the sixth transistor T6, and the seventh transistor T7 to a turn-on state, and checking whether the voltage of the data line DLj has (e.g., is set to) the voltage of the first voltage line VINT. However, the present disclosure is not limited thereto, and the electrical test of the second circuit unit PWMU may be possible by using other suitable methods, in addition to those described above.

However, because the first circuit unit PAMU is connected to the first global data line VRA that is common to the first sub-pixels, an electrical test through the first global data line VRA may be difficult. On the other hand, in the present embodiment, because the test transistor T19 is provided, the electrical test of the first circuit unit PAMU may also be possible through the data line DLj.

The electrical test of the first circuit unit PAMU may be performed in the same or substantially the same manner as that of the driving method described above with reference to FIG. 13. In the driving method illustrated in FIG. 13, because the test transistor T19 is always in a turn-off state, the driving current flows to the light emitting element LE. On the other hand, during the electrical test of the first circuit unit PAMU, after the data voltage is written to the first node N1, the test transistor T19 is set to a turn-on state, and thus, the driving current may flow to the data line DLj through the test transistor T19. In this case, it may be checked whether the first circuit unit PAMU normally operates by sensing the driving current through the data line DLj.

An electrical test sequence of the first circuit unit PAMU is described in more detail as follows. First, in a state in which the test transistor T19 is turned off, a data voltage corresponding to 255 grayscale (e.g., a white grayscale level) is applied to the first node N1 (e.g., at time point t3a). Second, in a state in which the test transistor T19 is turned on, the first emission signal and the second emission signal of the logic low level are supplied during one horizontal period, and a current flowing through the data line DLj is sensed. Third, in a state in which the test transistor T19 is turned off, a data voltage corresponding to 128 grayscale (e.g., a middle grayscale level) is applied to the first node N1 (e.g., at time point t3a). Fourth, in a state in which the test transistor T19 is turned on, the first emission signal and the second emission signal of the logic low level are supplied during one horizontal period, and the current flowing through the data line DLj is sensed. Fifth, in a state in which the test transistor T19 is turned off, a data voltage corresponding to 0 grayscale (e.g., a black grayscale level) is applied to the first node N1 (e.g., at time point t3a). Sixth, in a state in which the test transistor T19 is turned on, the first emission signal and the second emission signal of the logic low level are supplied during one horizontal period, and the current flowing through the data line DLj is sensed.

Figure 14:
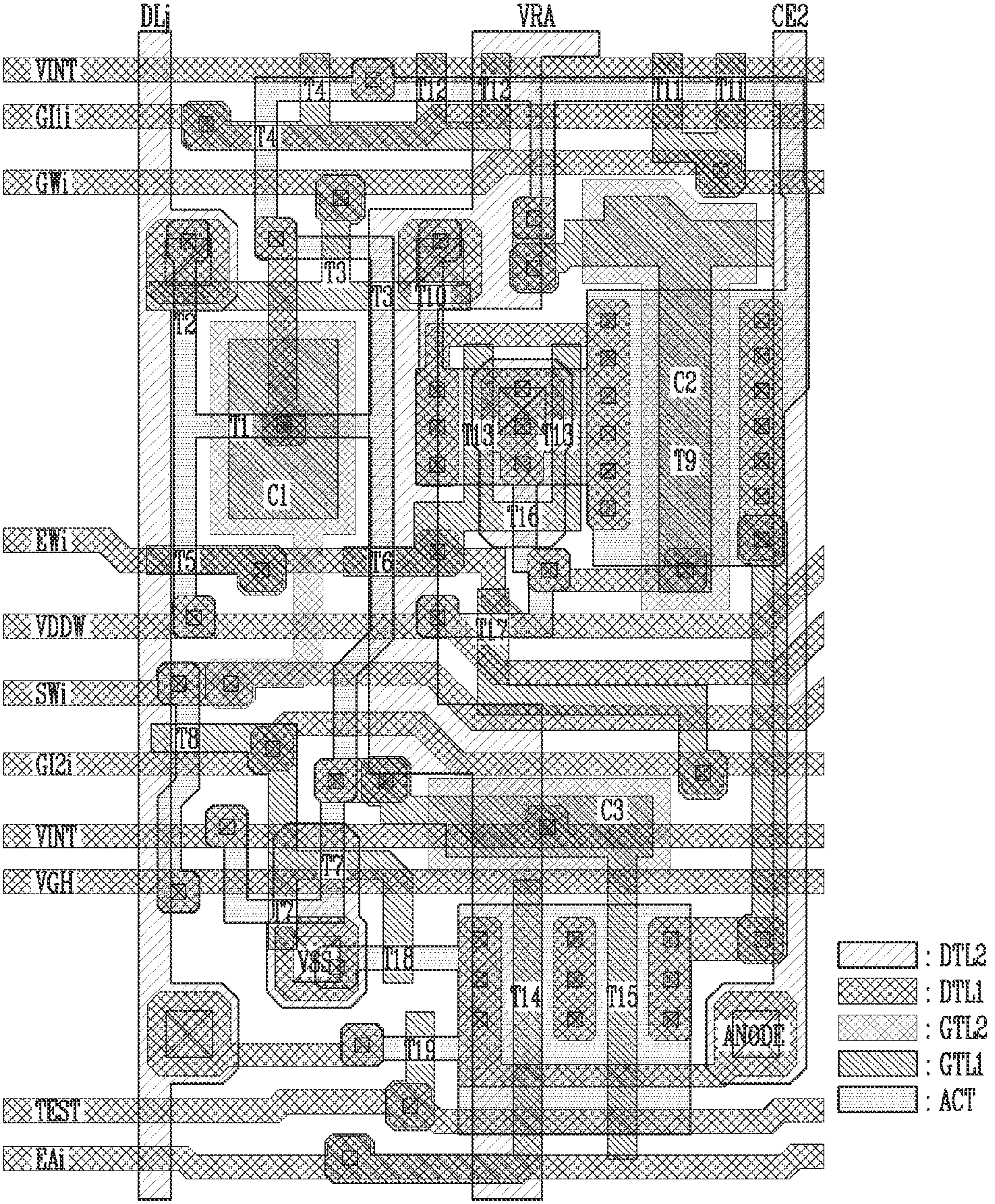
FIG. 14 is a diagram illustrating a layout of the pixel circuit of FIG. 12.
Figure 15:
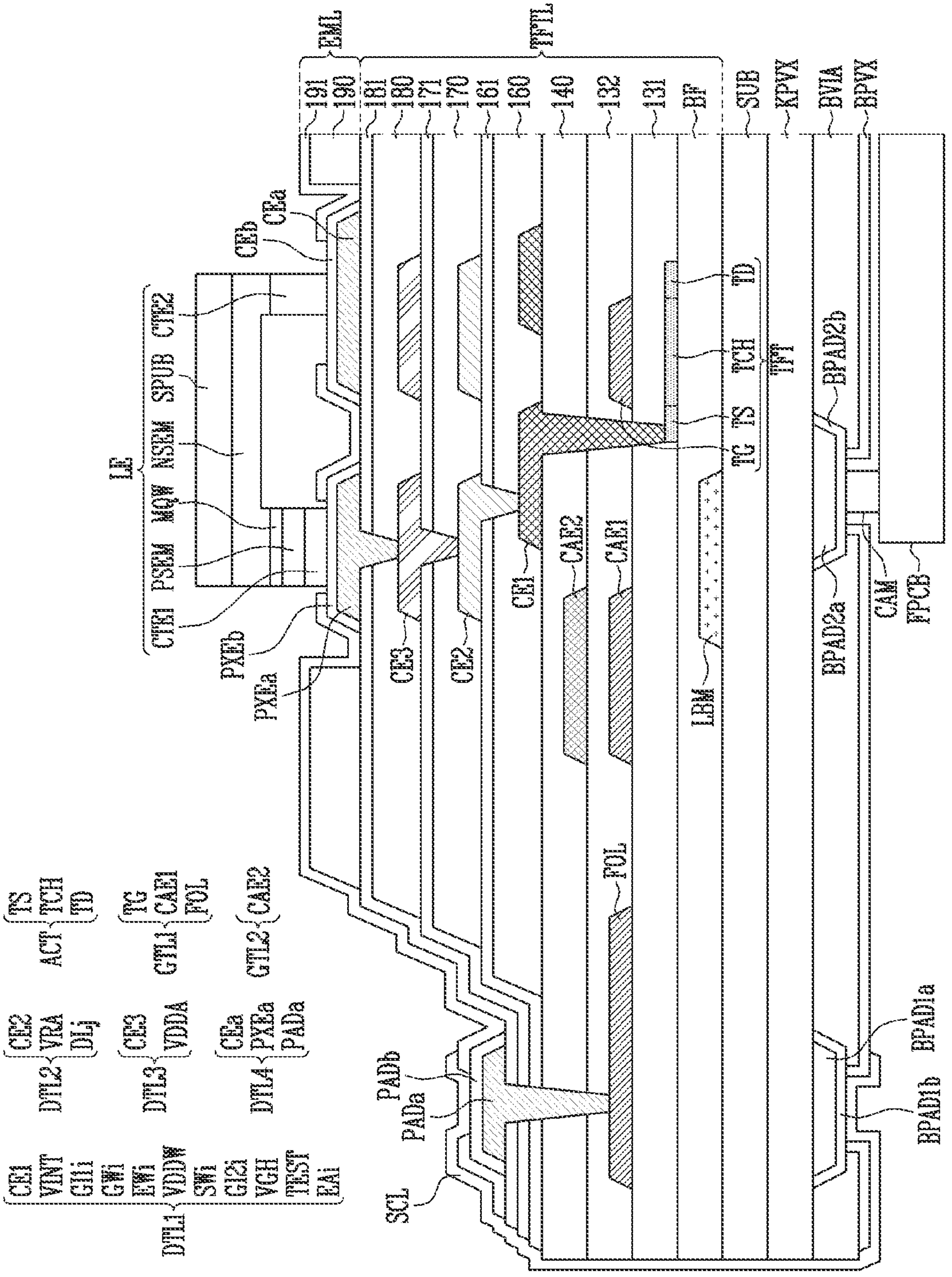
FIGS. 15-19 are diagrams illustrating a stacked structure of the display device.

FIG. 14 is a diagram illustrating a layout of the pixel circuit of FIG. 12. FIGS. 15 through 19 are diagrams illustrating a stacked structure of the display device. A stacked and connection structure of FIGS. 14 through 19 may be different from the stacked and connection structure of FIG. 9, and thus, the stacked and connection structure of FIGS. 14 through 19 may be described in more detail hereinafter.

For convenience, FIG. 14 shows the active layer ACT, the first gate layer GTL1, the second gate layer GTL2, the first data metal layer DTL1, and the second data metal layer DTL2 in more detail. A planar layout of a light blocking layer LBM, the third data metal layer DTL3, and a fourth data metal layer DTL4 are illustrated in more detail in FIGS. 16 through 19.

A thin film transistor layer TFTL may be disposed on the substrate SUB. The thin film transistor layer TFTL may be a layer in which thin film transistors (TFTs) are formed.

The thin film transistor layer TFTL includes the active layer ACT, the first gate layer GTL1, the second gate layer GTL2, the first data metal layer DTL1, the second data metal layer DTL2, and the third data metal layer DTL3. In addition, the display panel 100 includes the light blocking layer LBM, the buffer layer BF, the first gate insulating layer 131, the second gate insulating layer 132, the interlayer insulating layer 140, the first planarization layer 160, the first insulating layer 161, the second planarization layer 170, the second insulating layer 171, a third planarization layer 180, and a third insulating layer 181.

The substrate SUB may be a base substrate or a base member for supporting the display device 10. The substrate SUB may be a rigid substrate of a glass material. As another example, the substrate SUB may be a flexible substrate capable of bending, folding, rolling, or the like. In this case, the substrate SUB may include an insulating material, such as a polymer resin, for example, such as polyimide (PI).

The light blocking layer LBM may be disposed on a first surface of the substrate SUB. The light blocking layer LBM may block light transmitted from a second surface of the substrate SUB to prevent or substantially prevent the light emitting element LE from emitting light having an undesirable luminance.

Figure 16:
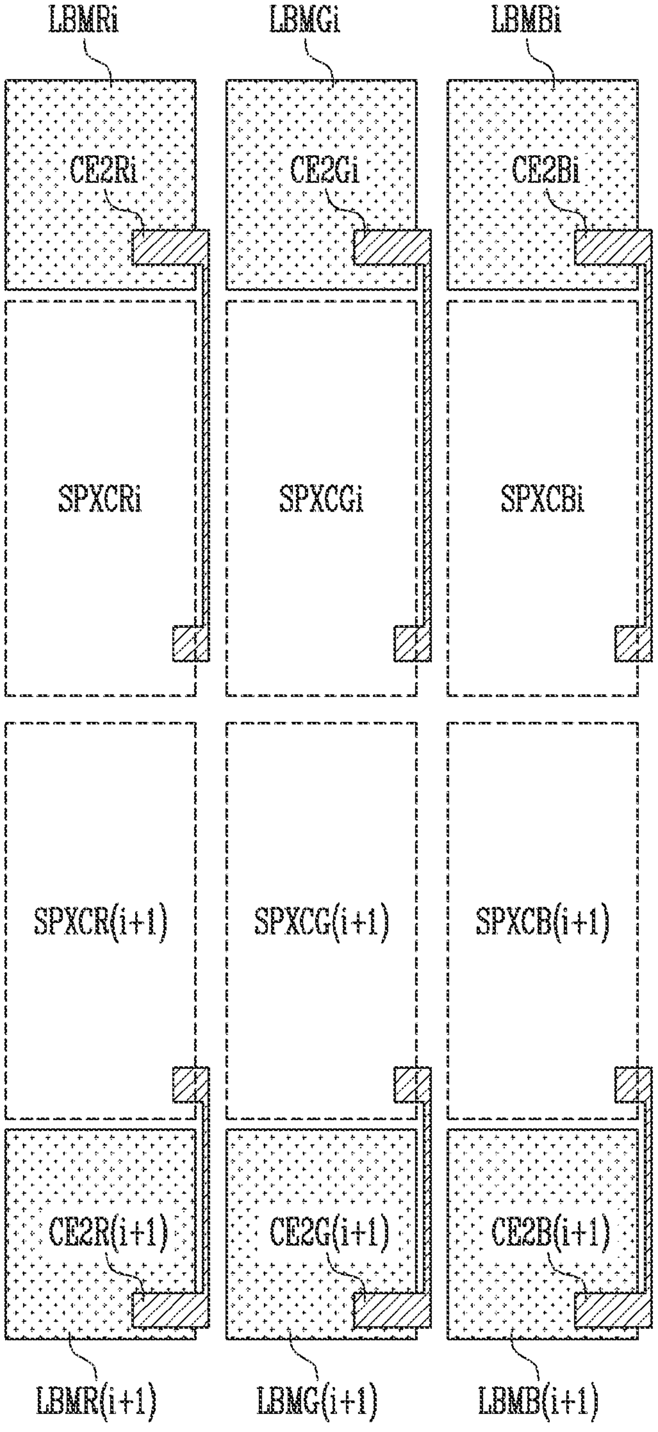

Referring to FIG. 16, the light blocking layers LBMRi, LBMGi, LBMBi, LBMR(i+1), LBMG(i+1), and LBMB(i+1) may be positioned to overlap with the corresponding light emitting elements LE, and may be positioned so as not to overlap with the transistors configuring pixel circuits SPXCRi, SPXCGi, SPXCBi, SPXCR(i+1), SPXCG(i+1), and SPXCB(i+1). A layout of the pixel circuits SPXCRi, SPXCGi, and SPXCBi of the sub-pixels of an i-th horizontal line may be the same or substantially the same as that illustrated in FIG. 14. Second connection electrodes CE2Ri, CE2Gi, and CE2Bi of the i-th horizontal line illustrated in FIG. 16 may have the same or substantially the same configuration as that of the second connection electrode CE2 illustrated in FIG. 14. A layout of the pixel circuits SPXCR(i+1), SPXCG(i+1), and SPXCB(i+1) of the sub-pixels of an (i+1)-th horizontal line may also be the same or substantially the same as that illustrated in FIG. 14. However, an extension direction of second connection electrodes CE2R(i+1), CE2G(i+1), and CE2B(i+1) may be opposite to an extension direction of the second connection electrodes CE2Ri, CE2Gi, and CE2Bi.

A disposition direction of the light blocking layers LBMR(i+1), LBMG(i+1), and LBMB(i+1) based on the pixel circuits SPXCR(i+1), SPXCG(i+1), and SPXCB(i+1) of the sub-pixels of the (i+1)-th horizontal line may be opposite to a disposition direction of the light blocking layers LBMRi, LBMGi, and LBMBi based on the pixel circuits SPXCRi, SPXCGi, and SPXCBi of the sub-pixels of the i-th horizontal line.

The buffer layer BF may be disposed on the first surface of the substrate SUB and the light blocking layer LBM. The buffer layer BF may be a layer for preventing or substantially preventing the penetration of air and/or moisture. The buffer layer BF may be formed of a plurality of inorganic layers that are alternately stacked on one another. For example, the buffer layer BF may be formed as multiple layers in which one or more inorganic layers of a silicon nitride layer, a silicon oxynitride layer, a silicon oxide layer, a titanium oxide layer, and an aluminum oxide layer are alternately stacked on one another. The buffer layer BF may be omitted as needed or desired.

The active layer ACT may be disposed on the buffer layer BF. The active layer ACT may include a silicon semiconductor, such as polycrystalline silicon, single crystal silicon, low-temperature polycrystalline silicon, and amorphous silicon, or an oxide semiconductor.

The active layer ACT may include a channel TCH, a first electrode TS, and a second electrode TD of the thin film transistor TFT. The channel TCH of the thin film transistor TFT may be an area overlapping with a gate electrode TG of the thin film transistor TFT in a thickness direction of the substrate SUB. The first electrode TS of the thin film transistor TFT may be disposed on one side of the channel TCH, and the second electrode TD may be disposed on another side of the channel TCH. The first electrode TS and the second electrode TD of the thin film transistor TFT may be areas that do not overlap with the gate electrode TG in the third direction DR3 (e.g., the thickness direction). The first electrode TS and the second electrode TD of the thin film transistor TFT may be areas having a suitable conductivity, by doping an ion in a semiconductor (e.g., a silicon semiconductor, an oxide semiconductor, or the like).

Referring to FIG. 14, the channel TCH, the first electrode TS, and the second electrode TD of the transistors T1, T2, T3, T4, T5, T6, T7, T11, and T12 may be integrally formed with each other in the active layer ACT. The channel TCH, the first electrode TS, and the second electrode TD of the transistors T9, T10, T13, T16, and T17 may be integrally formed with each other in the active layer ACT. In addition, the channel TCH, the first electrode TS, and the second electrode TD of the transistors T14, T15, T18, and T19 may be integrally formed with each other in the active layer ACT. On the other hand, the channel TCH, the first electrode TS, and the second electrode TD of the eighth transistor T8 may be separated from the channel TCH, the first electrode TS, and the second electrode TD of the other transistors in the active layer ACT.

The first gate insulating layer 131 may be disposed on the active layer ACT. The first gate insulating layer 131 may be formed of an inorganic layer, for example, such as a silicon nitride layer, a silicon oxynitride layer, a silicon oxide layer, a titanium oxide layer, or an aluminum oxide layer.

The first gate layer GTL1 may be disposed on the first gate insulating layer 131. The first gate layer GTL1 may include a gate electrode TG of the thin film transistor TFT, a first capacitor electrode CAE1, and a fan-out line FOL. However, a position of the fan-out line FOL may be variously modified as needed or desired in other embodiments. For example, the fan-out line FOL may be implemented in the second gate layer GTL2, or in the first data metal layer DTL1. The first gate layer GTL1 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

Referring to FIG. 14, the gate electrode TG of the first transistor T1 may be separated from the gate electrodes TG of the other transistors in the first gate layer GTL1, and may be configured integrally with the first capacitor electrode CAE1 of the first capacitor C1. The gate electrodes TG of the transistors T2, T3, and T10 may be integrally formed in the first gate layer GTL1. The gate electrode TG of the fifth transistor T5 may be separated from the gate electrodes TG of the other transistors in the first gate layer GTL1. The gate electrodes TG of the transistors T4 and T12 may be integrally configured in the first gate layer GTL1. The gate electrode TG of the ninth transistor T9 may be separated from the gate electrodes TG of the other transistors in the first gate layer GTL1, and may be configured integrally with the first capacitor electrode CAE1 of the second capacitor C2. The gate electrode TG of the eleventh transistor T11 may be separated from the gate electrodes TG of the other transistors in the first gate layer GTL1. The gate electrodes TG of the transistors T6, T13, and T16 may be integrally configured in the first gate layer GTL1. The gate electrode TG of the seventeenth transistor T17 may be separated from the gate electrodes TG of the other transistors in the first gate layer GTL1. The gate electrodes TG of the transistors T8, T7, and T18 may be integrally configured in the first gate layer GTL1. The gate electrode TG of the fourteenth transistor T14 may be separated from the gate electrodes TG of the other transistors in the first gate layer GTL1. The gate electrode TG of the fifteenth transistor T15 may be separated from the gate electrodes TG of the other transistors in the first gate layer GTL1, and may be configured integrally with the first capacitor electrode CAE1 of the third capacitor C3. The gate electrode TG of the nineteenth transistor T19 may be separated from the gate electrodes TG of the other transistors in the first gate layer GTL1.

The second gate insulating layer 132 may be disposed on the first gate layer GTL1. The second gate insulating layer 132 may be formed of an inorganic layer, for example, such as a silicon nitride layer, a silicon oxynitride layer, a silicon oxide layer, a titanium oxide layer, or an aluminum oxide layer.

The second gate layer GTL2 may be disposed on the second gate insulating layer 132. The second gate layer GTL2 may include a second capacitor electrode CAE2. The second gate layer GTL2 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof. Referring to FIG. 14, the second capacitor electrodes CAE2 of the capacitors C1, C2, and C3 may be separated from each other in the second gate layer GTL2.

The interlayer insulating layer 140 may be disposed on the second gate layer GTL2. The interlayer insulating layer 140 may be formed of an inorganic layer, for example, such as a silicon nitride layer, a silicon oxynitride layer, a silicon oxide layer, a titanium oxide layer, or an aluminum oxide layer.

On the interlayer insulating layer 140, the first data metal layer DTL1 including the first connection electrode CE1, the first voltage line VINT, the second voltage line VDDW, the third voltage line VGH, the first initialization line GI1i, and the second initialization GI2i, the scan line GWi, the first emission line EWi, the second emission line EAi, and the test line TEST may be disposed. The first data metal layer DTL1 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

The first connection electrode CE1 may be connected to the first electrode TS or the second electrode TD of the thin film transistor TFT through a contact hole passing through (e.g., penetrating) the second gate insulating layer 132 and the interlayer insulating layer 140.

Referring to FIG. 14, the first data metal layer DTL1 including the first voltage line VINT, the second voltage line VDDW, the third voltage line VGH, the first initialization line GI1i, the second initialization line GI2i, the scan line GWi, the first emission line EWi, the second emission line EAi, and the test line TEST may extend in a horizontal line direction. The horizontal line direction may indicate a direction in which the pixel circuits SPXCRi, SPXCGi, and SPXCBi of the sub-pixels of the i-th horizontal line are aligned with one another (e.g., refer to FIG. 16). The pixel circuits SPXCRi, SPXCGi, and SPXCBi of the same horizontal line may be connected to the same first voltage line VINT, second voltage line VDDW, third voltage line VGH, first initialization line GI1i, second initialization line GI2i, the scan line GWi, the first emission line EWi, the second emission line EAi, and the test line TEST as each other.

The first planarization layer 160 for flattening or substantially flattening a step difference may be formed on the first data metal layer DTL1. The first planarization layer 160 may be formed of an organic layer, such as an acrylic resin, an epoxy resin, a phenolic resin, a polyamide resin, or a polyimide resin.

The first insulating layer 161 may be disposed on the first planarization layer 160. The first insulating layer 161 may be formed of an inorganic layer, for example, such as a silicon nitride layer, a silicon oxynitride layer, a silicon oxide layer, a titanium oxide layer, or an aluminum oxide layer.

The second data metal layer DTL2 may be formed on the first insulating layer 161. The second data metal layer DTL2 may include the second connection electrode CE2, the first global data line VRA, and the data line DLj. The second data metal layer DTL2 may further include a second global data line and a third global data line.

The second connection electrode CE2 may be connected to the first connection electrode CE1 through a contact hole passing through (e.g., penetrating) the first insulating layer 161 and the first planarization layer 160. The second data metal layer DTL2 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

Referring to FIG. 14, the second connection electrode CE2, the first global data line VRA, and the data line DLj may extend in a vertical line direction. The vertical line direction may be a direction perpendicular to or substantially perpendicular to the horizontal line direction. For example, the vertical line direction may be an arrangement direction of the pixel circuits SPXCRi and SPXCR(i+1) (e.g., refer to FIG. 16). The pixel circuits SPXCRi and SPXCR(i+1) positioned at (e.g., in or on) the same vertical line as each other may be connected to the same data line.

The second planarization layer 170 for flattening or substantially flattening a step difference may be formed on the second data metal layer DTL2. The second planarization layer 170 may be formed of an organic layer, such as an acrylic resin, an epoxy resin, a phenolic resin, a polyamide resin, or a polyimide resin.

The second insulating layer 171 may be disposed on the second planarization layer 170. The second insulating layer 171 may be formed of an inorganic layer, for example, such as a silicon nitride layer, a silicon oxynitride layer, a silicon oxide layer, a titanium oxide layer, or an aluminum oxide layer.

The third data metal layer DTL3 may be formed on the second insulating layer 171. The third data metal layer DTL3 may include a third connection electrode CE3 and the first power line VDDA.

The third connection electrode CE3 may be connected to the second connection electrode CE2 through a contact hole passing through (e.g., penetrating) the second insulating layer 171 and the second planarization layer 170. The third data metal layer DTL3 may be formed as a single layer or multiple layers including at least one of molybdenum (Mo), aluminum (Al), chromium (Cr), gold (Au), titanium (Ti), nickel (Ni), neodymium (Nd), copper (Cu), or a suitable alloy thereof.

Figure 17:
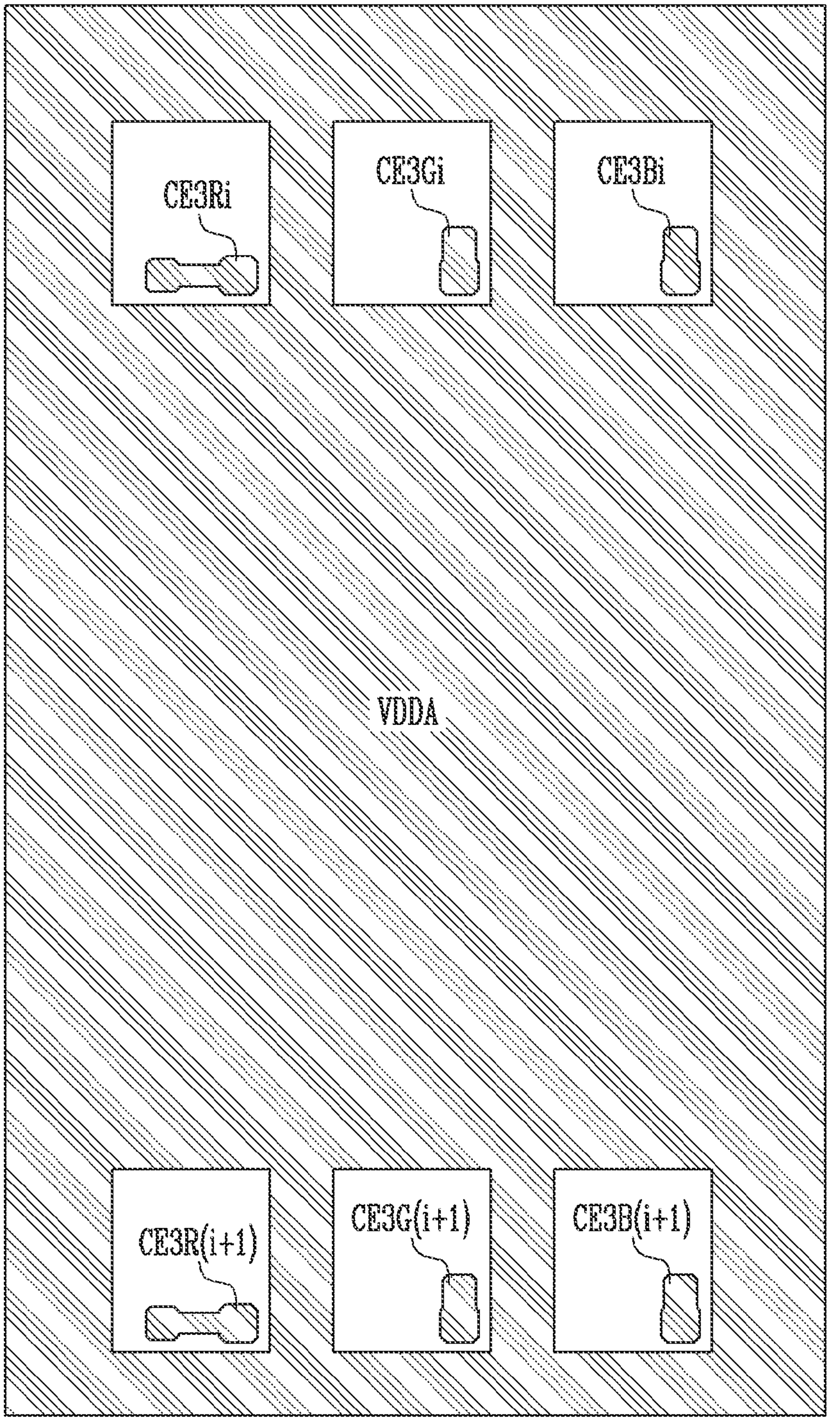

Referring to FIG. 17, the first power line VDDA may be configured in a plate shape. Accordingly, a high current may flow through the first power line VDDA. Referring further to FIG. 16, at a position corresponding to the light blocking layers LBMRi, LBMGi, LBMBi, LBMR(i+1), LBMG(i+1), and LBMB(i+1), the first power line VDDA may include openings. Corresponding third connection electrodes CE3Ri, CE3Gi, CE3Bi, CE3R(i+1), CE3G(i+1), and CE3B (i+1) may be positioned within (e.g., inside) the openings. The third connection electrodes CE3Ri, CE3Gi, CE3Bi, CE3R(i+1), CE3G(i+1), and CE3B(i+1) may be connected to the second connection electrodes CE2Ri, CE2Gi, CE2Bi, CE2R(i+1), CE2G(i+1), and CE2B(i+1)), respectively (e.g., refer to FIGS. 16 and 17).

The third planarization layer 180 for flattening or substantially flattening a step difference may be formed on the third data metal layer DTL3. The third planarization layer 180 may be formed of an organic layer, such as an acrylic resin, an epoxy resin, a phenolic resin, a polyamide resin, or a polyimide resin.

The third insulating layer 181 may be disposed on the third planarization layer 180. The third insulating layer 181 may be formed of an inorganic layer, for example, such as a silicon nitride layer, a silicon oxynitride layer, a silicon oxide layer, a titanium oxide layer, or an aluminum oxide layer.

The light emitting element layer EML may be disposed on the third insulating layer 181. The light emitting element layer EML includes a pixel electrode PXEa, a common electrode CEa, and the light emitting element LE. According to an embodiment, cover electrodes PXEb and CEb may be positioned on the pixel electrode PXEa and the common electrode CEa, respectively.

The fourth data metal layer DTL4 may include the pixel electrode PXEa, the common electrode CEa, and a pad PADa. According to an embodiment, a cover electrode PADb may also be positioned on the pad PADa. Each of the first sub-pixel SPX1, the second sub-pixel SPX2, and the third sub-pixel SPX3 includes the corresponding light emitting element LE connected to the cover electrode PXEb of the pixel electrode PXEa and the cover electrode CEb of the common electrode CEa. The pixel electrode PXEa may be referred to as an anode electrode, and the common electrode CEa may be referred to as a cathode electrode. The pixel electrode PXEa and the common electrode CEa may be disposed on the third insulating layer 181. Each of the pixel electrodes PXEa may be connected to a corresponding third connection electrode CE3 through a contact hole passing through (e.g., penetrating) the third insulating layer 181 and the third planarization layer 180.

Accordingly, each of the pixel electrodes PXEa may be connected to the corresponding first electrode TS or the corresponding second electrode TD of the corresponding thin film transistor TFT through the first, second, and third connection electrodes CE1, CE2, and CE3. Therefore, an anode voltage controlled by the thin film transistor TFT may be applied to the pixel electrode PXEa.

The pixel electrodes PXEa, the common electrodes CEa, and the pads PADa may include a metal material having a high reflectance, such as a stacked structure of aluminum and titanium (e.g., Ti/Al/Ti), a stacked structure of aluminum and ITO (e.g., ITO/Al/ITO), an APC alloy, or a stacked structure of an APC alloy and ITO (e.g., ITO/APC/ITO). The APC alloy is an alloy of silver (Ag), palladium (Pd), and copper (Cu). The cover electrodes PXEb, CEb, and PADb may include a transparent conductive material (TCO), such as ITO or IZO.

Figure 18:
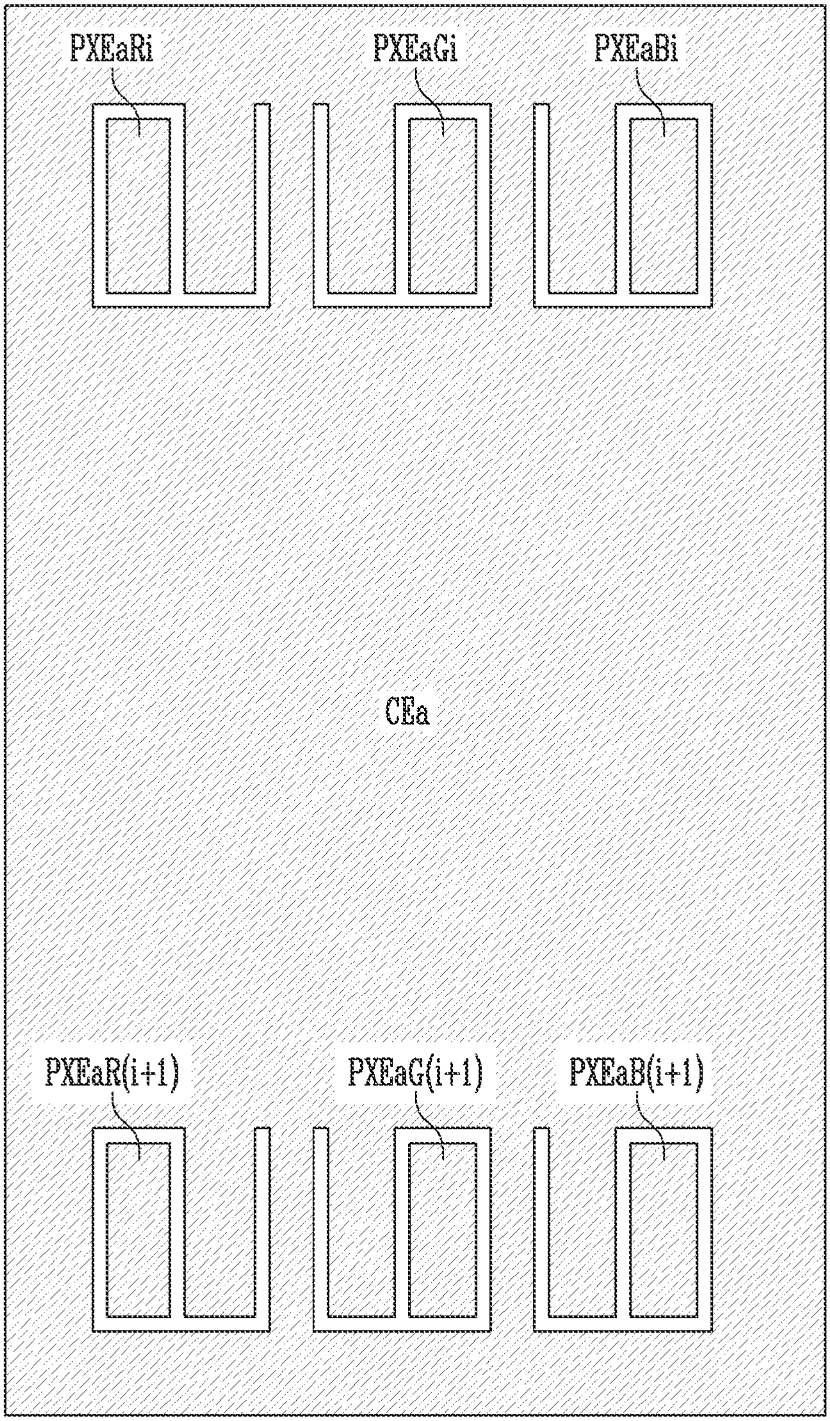

Referring to FIG. 18, the common electrode CEa may be configured in a plate shape. The common electrode CEa may be the second power line VSS illustrated in FIG. 12. Accordingly, a high current may flow through the common electrode CEa (e.g., through the second power line VSS). Pixel electrodes PXEaRi, PXEaGi, PXEaBi, PXEaR(i+1), PXEaG(i+1), and PXEaB(i+1) may be connected to the third connection electrodes CE3Ri, CE3Gi, CE3Bi, CE3R(i+1), CE3G(i+1), and CE3B(i+1), respectively (e.g., refer to FIGS. 17 and 18).

Figure 19:
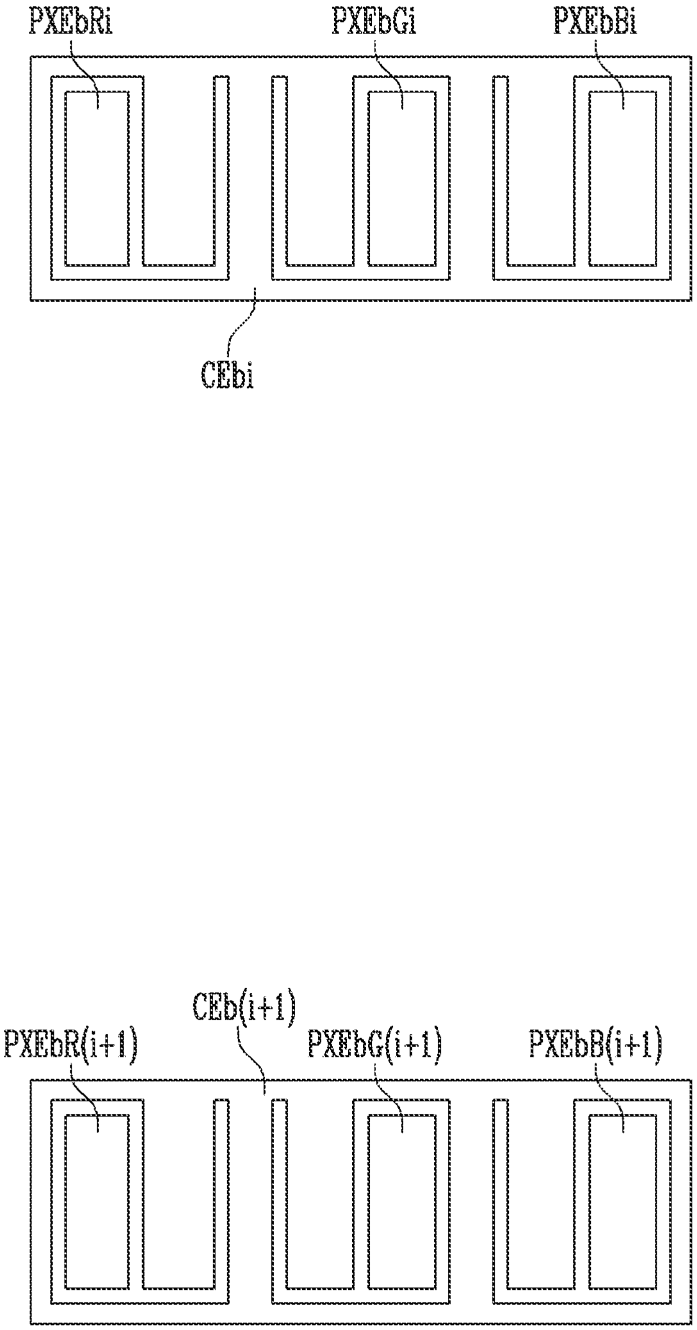

Referring to FIG. 19, cover electrodes PXEbRi, PXEbGi, PXEbBi, PXEbR(i+1), PXEbG(i+1), and PXEbB(i+1) are shown as an example. In addition, cover electrodes CEbi and CEb(i+1) covering a portion of the common electrode, where the light emitting elements LE are to be disposed, are shown as an example.

Referring to a relative position of the cover electrodes PXEbRi, PXEbGi, PXEbBi, PXEbR(i+1), PXEbG(i+1), and PXEbB(i+1) and the cover electrodes CEbi and CEb(i+1), a disposition direction of a cathode and an anode PXEaRi and PXEaR(i+1) of the first light emitting element may be opposite to a disposition direction of a cathode and an anode PXEaGi and PXEaG(i+1) of the second light emitting element. In addition, a disposition direction of a cathode and an anode PXEaBi and PXEaB(i+1) of the third light emitting element may be the same as the disposition direction of the cathode and the anode PXEaGi and PXEaG(i+1) of the second light emitting element. For example, the first light emitting element may be an element for emitting red light, the second light emitting element may be an element for emitting green light, and the third light emitting element may be an element for emitting blue light. According to the present embodiment, color mixing according to a viewing angle may be alleviated.

Each of the light emitting elements LE may be a flip chip type of a micro light emitting diode element, in which the first contact electrode CTE1 and the second contact electrode CTE2 face the pixel electrode PXEa and the common electrode CEa. The light emitting element LE may be formed of an inorganic material, such as GaN. A length of each direction thereof may be several to several hundred μm. For example, a length of each direction of the light emitting element LE may be about 100 μm or less.

The light emitting elements LE may be grown on a semiconductor substrate, such as a silicon wafer, to be formed. Each of the light emitting elements LE may be directly transferred onto the cover electrode PXEb of the pixel electrode PXEa of the substrate SUB and the cover electrode CEb of the common electrode CEa from the silicon wafer. As another example, each of the light emitting elements LE may be transferred onto the cover electrode PXEb of the pixel electrode PXEa and the cover electrode CEb of the common electrode CEa of the substrate SUB through an electrostatic method using an electrostatic head, or a stamp method using an elastic polymer material, such as PDMS or silicon, as a transfer substrate.

Each of the light emitting elements LE may be a light emitting structure including the base substrate SPUB, the n-type semiconductor NSEM, the active layer MQW, the p-type semiconductor PSEM, the first contact electrode CTE1, and the second contact electrode CTE2.

The base substrate SPUB may be a sapphire substrate, but the present disclosure is not limited thereto.

The n-type semiconductor NSEM may be disposed on one surface of the base substrate SPUB. For example, the n-type semiconductor NSEM may be disposed on a lower surface of the base substrate SPUB. The n-type semiconductor NSEM may be formed of GaN doped with an n-type conductive dopant, such as Si, Ge, or Sn.

The active layer MQW may be disposed on a portion of one surface of the n-type semiconductor NSEM. The active layer MQW may include a material of a single or multiple quantum well structure. When the active layer MQW includes the material of the multiple quantum well structure, the active layer MQW may have a structure in which a plurality of well layers and barrier layers are alternately stacked on one another. In this case, the well layer may be formed of InGaN, and the barrier layer may be formed of GaN or AlGaN, but are not limited thereto. As another example, the active layer MQW may have a structure in which a semiconductor material having a large band gap energy and a semiconductor material having a small band gap energy are alternately stacked on one another, and may also include group 3 to group 5 semiconductor materials that are different according to a desired wavelength band of emitted light.

The p-type semiconductor PSEM may be disposed on one surface of the active layer MQW. The p-type semiconductor PSEM may be formed of GaN doped with a p-type conductive dopant, such as Mg, Zn, Ca, Se, or Ba.

The first contact electrode CTE1 may be disposed on the p-type semiconductor PSEM, and the second contact electrode CTE2 may be disposed on another portion of one surface of the n-type semiconductor NSEM. The other portion of the one surface of the n-type semiconductor NSEM on which the second contact electrode CTE2 is disposed may be disposed to be spaced apart from the portion of the one surface of the n-type semiconductor NSEM on which the active layer MQW is disposed.

The first contact electrode CTE1 and the cover electrode PXEb of the pixel electrode PXE may be adhered to each other through a conductive adhesive member, such as an anisotropic conductive film (ACF) or an anisotropic conductive paste (ACP). As another example, the first contact electrode CTE1 and the cover electrode PXCb of the pixel electrode PXE may be adhered to each other through a soldering process.

The bank 190 may be disposed on the second insulating layer 171. The bank 190 may be formed an organic layer, such as an acryl resin, an epoxy resin, a phenolic resin, a polyamide resin, or a polyimide resin.

The bank insulating layer 191 may be disposed on the bank 190. The bank insulating layer 191 may cover edges of the cover electrode PXEb of the pixel electrode PXEa and the cover electrode CEb of the common electrode CEa. The bank insulating layer 191 may be formed of an inorganic layer, for example, such as a silicon nitride layer, a silicon oxynitride layer, a silicon oxide layer, a titanium oxide layer, or an aluminum oxide layer.

The pad PADa may be connected to the fan-out line FOL through a contact hole. In the present embodiment, the pad PADa is shown as being configured of the fourth data metal layer DTL4, but in another embodiment, the pad PADa may be configured in a structure in which at least some of the plurality of metal layers GTL1, GTL2, DTL1, DTL2, DTL3, and DTL4 are stacked.

A first back surface insulating layer KPVX may be disposed on the second surface (e.g., the lower surface) of the substrate SUB. The first back surface insulating layer KPVX may be used as a key for alignment during an exposure process.

A first back surface pad BPAD1a and a second back surface pad BPAD2a may be disposed on the first back surface insulating layer KPVX. In addition, lines connecting the first back surface pad BPAD1a and the second back surface pad BPAD2a may be positioned. In addition, according to an embodiment, the first back surface pad BPAD1a and the second back surface pad BPAD2a may be covered by cover electrodes BPAD1 b and BPAD2b.

The back surface pads BPAD1a and BPAD2a and the lines may include a metal material having a high reflectance, such as a stacked structure of aluminum and titanium (e.g., Ti/Al/Ti), a stacked structure of aluminum and ITO (e.g., ITO/Al/ITO), an APC alloy, or a stacked structure of an APC alloy and ITO (e.g., ITO/APC/ITO). The APC alloy is an alloy of silver (Ag), palladium (Pd), and copper (Cu). The cover electrodes BPAD1 b and BPAD2b may include a transparent metal material (TCO), such as ITO or IZO.

The back surface planarization layer BVIA may cover edges of the lines and the cover electrodes BPAD1 b and BPAD2b on the second surface of the substrate SUB. The back surface planarization layer BVIA may be formed of an organic layer, such as an acrylic resin, an epoxy resin, a phenolic resin, a polyamide resin, or a polyimide resin.

The second back surface insulating layer BPVX may be disposed on the back surface planarization layer BVIA. The second back surface insulating layer BPVX may be formed of an inorganic layer, for example, such as a silicon nitride layer, a silicon oxynitride layer, or a silicon oxide layer, a titanium oxide layer, or an aluminum oxide layer. The second back surface insulating layer BPVX may cover an edge of the cover electrodes BPAD1 b and BPAD2b.

The side surface line SCL may be disposed on an edge of the first surface, a side surface, and an edge of the second surface of the substrate SUB. One end of the side surface line SCL may be connected to the cover electrode PADb of the pad PADa, and another end of the side surface line SCL may be connected to the cover electrodes BPAD1 b of the first back surface pad BPAD1a.

The flexible film FPCB may be disposed on a lower surface of the second back surface insulating layer BPVX. The flexible film FPCB may be connected to the cover electrode BPAD2b of the second back surface pad BPAD2a through the conductive adhesive member CAM. A source driving circuit for supplying data voltages to the data lines may be disposed on a lower surface of the flexible film FPCB. The conductive adhesive member CAM may be an anisotropic conductive film or an anisotropic conductive paste.

Figure 20:
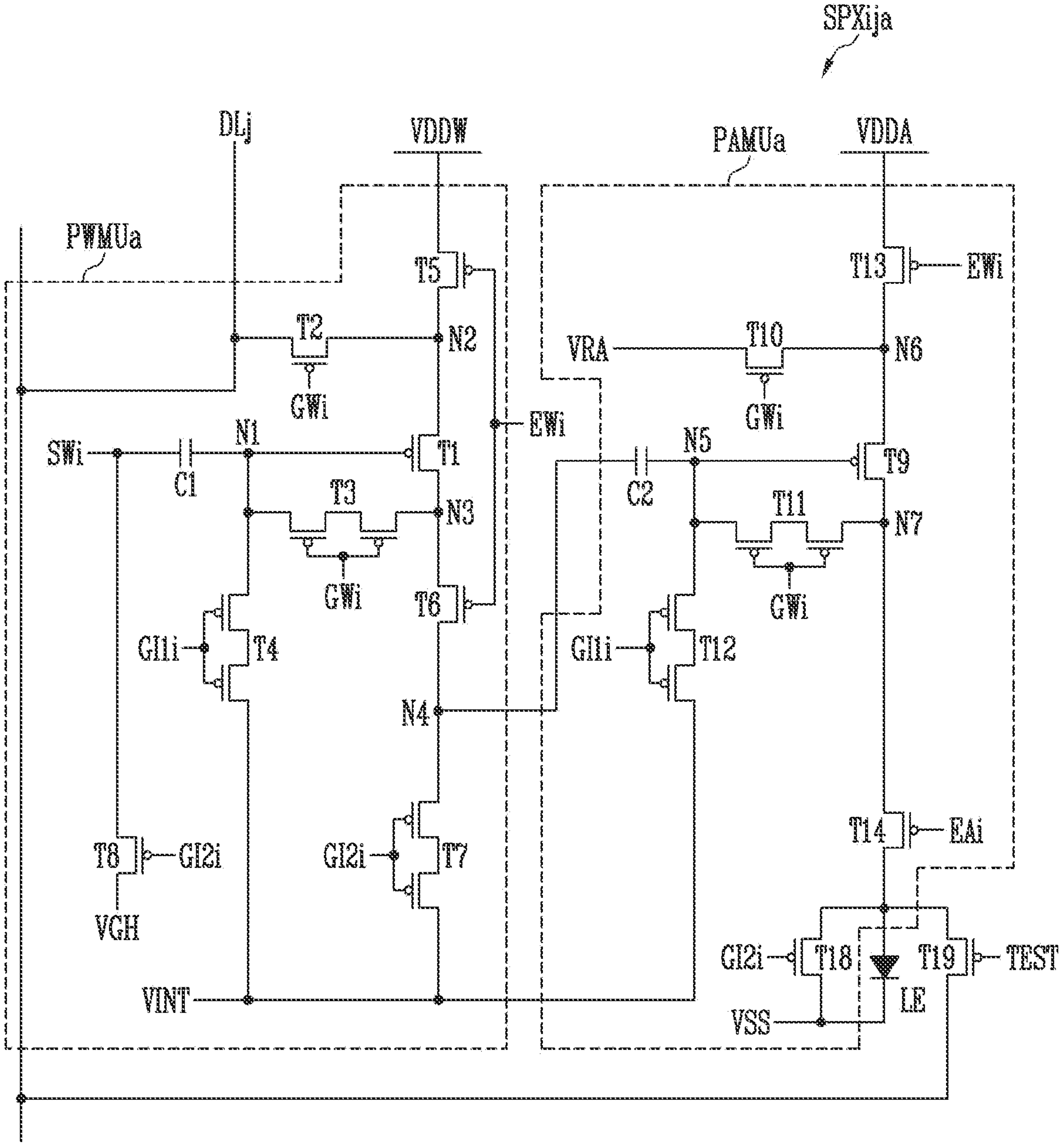
FIG. 20 is a diagram illustrating a pixel circuit according to another embodiment.

FIG. 20 is a diagram illustrating a pixel circuit according to another embodiment.

Referring to FIG. 20, the sub-pixel SPXija according to another embodiment of the present disclosure may include a first circuit unit (e.g., a first circuit) PAMUa, a second circuit unit (e.g., a second circuit) PWMUa, a light emitting element LE, and a test transistor T19. Hereinafter, for convenience, the sub-pixel SPXija is described in more detail in the context of the first sub-pixel for the first color.

The light emitting element LE may be an inorganic light emitting element having an inorganic semiconductor. For example, the light emitting element LE may be a flip chip type of a micro light emitting diode element. In another embodiment, the light emitting element LE may be configured of an organic light emitting diode, a quantum dot light emitting diode, or the like. In addition, although only one light emitting element LE is shown, the light emitting element LE may be configured of a plurality of ultra-small light emitting elements. For example, the plurality of ultra-small light emitting elements may be connected in series, parallel, or series-parallel.

The first circuit unit PAMUa may supply a driving current based on the first global data voltage received from the first global data line VRA to the light emitting element LE. The first circuit unit PAMUa may be a pulse amplitude modulation (PAM) circuit unit (e.g., a PAM circuit). Because different global data voltages are supplied to sub-pixels of different colors from each other, a magnitude of the driving current generated by the first circuit unit PAMUa may be different for each color.

The second circuit unit PWMUa may control a supply period of the driving current based on a data voltage received from the data line DLj. The second circuit unit PWMUa may be a pulse width modulation (PWM) circuit unit (e.g., a PWM circuit). When the supply period of the driving current is shortened, the emission period of the sub-pixel SPXija is shortened, and thus, a luminance of the sub-pixel SPXija may decrease. When the supply period of the driving current is lengthened, the emission period of the sub-pixel SPXija is lengthened, and thus, the luminance of the sub-pixel SPXija may increase.

The test transistor T19 may have a first electrode connected to an anode of the light emitting element LE, and a second electrode connected to the data line DLj. A gate electrode of the test transistor T19 may be connected to a test line TEST.

According to one or more embodiments of the present disclosure, the transistors may be configured as P-type transistors. In another embodiment, the transistors may be configured as N-type transistors. In another embodiment, the transistors may be configured as a combination of an N-type transistor and a P-type transistor. The P-type transistor refers to a transistor in which an amount of conducting current increases, when a voltage difference between a gate electrode and a source electrode thereof increases in a negative direction. The N-type transistor refers to a transistor in which an amount of conducting current increases, when a voltage difference between a gate electrode and a source electrode thereof increases in a positive direction. The transistor may be configured in various suitable forms, such as a thin film transistor (TFT), a field effect transistor (FET), and a bipolar junction transistor (BJT).

The second circuit unit PWMUa may include first to eighth transistors T1 to T8, and a first capacitor C1.

The first transistor T1 may have a gate electrode connected to a first node N1, a first electrode connected to a second node N2, and a second electrode connected to a third node N3. The second transistor T2 may have a gate electrode connected to the scan line GWi, a first electrode connected to the data line DLj, and a second electrode connected to the second node N2. The third transistor T3 may have a gate electrode connected to the scan line Gwi, a first electrode connected to the first node N1, and a second electrode connected to the third node N3. The fourth transistor T4 may have a gate electrode connected to the first initialization line GI1i, a first electrode connected to the first node N1, and a second electrode connected to a first voltage line VINT. The first capacitor C1 may have a first electrode connected to the sweep line Swi, and a second electrode connected to the first node N1. The fifth transistor T5 may have a gate electrode connected to the first emission line EWi, a first electrode connected to a second voltage line VDDW, and a second electrode connected to the second node N2. The sixth transistor T6 may have a gate electrode connected to the first emission line EWi, a first electrode connected to the third node N3, and a second electrode connected to a fourth node N4. The seventh transistor T7 may have a gate electrode connected to the second initialization line GI2i, a first electrode connected to the fourth node N4, and a second electrode connected to the first voltage line VINT. The eighth transistor T8 may have a gate electrode connected to the second initialization line GI2i, a first electrode connected to the sweep line SWi, and a second electrode connected to a third voltage line VGH. For example, each of the third transistor T3, the fourth transistor T4, and the seventh transistor T7 may include series-connected sub-transistors. Accordingly, a leakage current of the first node N1 and the fourth node N4 may be prevented or substantially prevented from occurring.

The first circuit unit PAMUa may include ninth to fourteenth transistors T9 to T14, an eighteenth transistor T18, and a second capacitor C2.

The ninth transistor T9 may have a gate electrode connected to a fifth node N5, a first electrode connected to a sixth node N6, and a second electrode connected to a seventh node N7. The tenth transistor T10 may have a gate electrode connected to the scan line GWi, a first electrode connected to the first global data line VRA, and a second electrode connected to the sixth node N6. The eleventh transistor T11 may have a gate electrode connected to the scan line GWi, a first electrode connected to the fifth node N5, and a second electrode connected to the seventh node N7. The twelfth transistor T12 may have a gate electrode connected to the first initialization line GI1i, a first electrode connected to the fifth node N5, and a second electrode connected to the first voltage line VINT. The thirteenth transistor T13 may have a gate electrode connected to the first emission line EWi, a first electrode connected to a first power line VDDA, and a second electrode connected to the sixth node N6. The fourteenth transistor T14 may have a gate electrode connected to the second emission line EAi, a first electrode connected to the second node N7, and a second electrode connected to the anode of the light emitting element LE. The second capacitor C2 may include a first electrode connected to the fourth node N4, and a second electrode connected to the fifth node N5. The eighteenth transistor T18 may have a gate electrode connected to the second initialization line GI2i, a first electrode connected to the anode of the light emitting element LE, and a second electrode connected to a second power line VSS. For example, each of the eleventh transistor T11 and the twelfth transistor T12 may include series-connected sub-transistors. Accordingly, a leakage current of the fifth node N5 may be prevented or substantially prevented from occurring.

Because a driving method and an electrical test method of the sub-pixel SPXija may be the same or substantially the same as the driving method and the electrical test method described above with reference to FIG. 13, redundant description thereof are not repeated.

Figure 21:
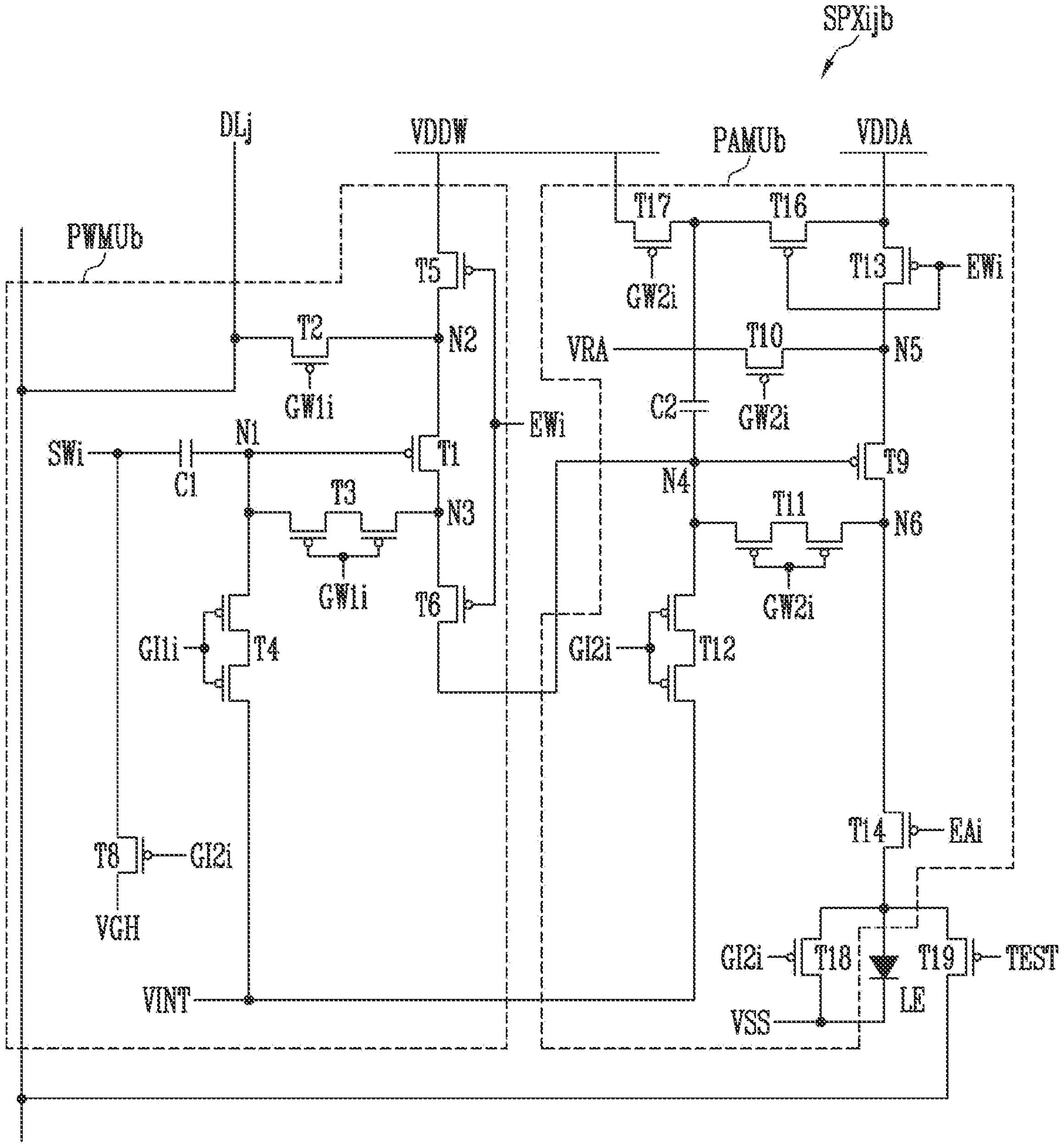
FIG. 21 is a diagram illustrating a pixel circuit according to another embodiment.

FIG. 21 is a diagram illustrating a pixel circuit according to another embodiment.

Referring to FIG. 21, the sub-pixel SPXijb according to another embodiment of the present disclosure may include a first circuit unit (e.g., a first circuit) PAMUb, a second circuit unit (e.g., a second circuit) PWMUb, a light emitting element LE, and a test transistor T19. Hereinafter, for convenience, the sub-pixel SPXijb is described in more detail hereinafter in the context of the first sub-pixel for the first color.

The light emitting element LE may be an inorganic light emitting element having an inorganic semiconductor. For example, the light emitting element LE may be a flip chip type of a micro light emitting diode element. In another embodiment, the light emitting element LE may be configured of an organic light emitting diode, a quantum dot light emitting diode, or the like. In addition, although only one light emitting element LE is shown, the light emitting element LE may be configured of a plurality of ultra-small light emitting elements. For example, the plurality of ultra-small light emitting elements may be connected in series, parallel, or series-parallel.

The first circuit unit PAMUb may supply a driving current based on the first global data voltage received from the first global data line VRA to the light emitting element LE. The first circuit unit PAMUb may be a pulse amplitude modulation (PAM) circuit unit (e.g., a PAM circuit). Because different global data voltages are supplied to sub-pixels of different colors from each other, a magnitude of the driving current generated by the first circuit unit PAMUb may be different for each color.

The second circuit unit PWMUb may control a supply period of the driving current based on a data voltage received from the data line DLj. The second circuit unit PWMUb may be a pulse width modulation (PWM) circuit unit (e.g., a PWM circuit). When the supply period of the driving current is shortened, the emission period of the sub-pixel SPXijb is shortened, and thus, a luminance of the sub-pixel SPXijb may decrease. When the supply period of the driving current is lengthened, the emission period of the sub-pixel SPXijb is lengthened, and thus, the luminance of the sub-pixel SPXijb may increase.

The test transistor T19 may have a first electrode connected to an anode of the light emitting element LE, and a second electrode connected to the data line DLj. A gate electrode of the test transistor T19 may be connected to a test line TEST.

According to one or more embodiments of the present disclosure, the transistors may be configured as P-type transistors. In another embodiment, the transistors may be configured as N-type transistors. In another embodiment, the transistors may be configured as a combination of an N-type transistor and a P-type transistor. The P-type transistor refers to a transistor in which an amount of conducting current increases, when a voltage difference between a gate electrode and a source electrode thereof increases in a negative direction. The N-type transistor refers to a transistor in which an amount of conducting current increases, when a voltage difference between a gate electrode and a source electrode thereof increases in a positive direction. The transistor may be configured in various suitable forms, such as a thin film transistor (TFT), a field effect transistor (FET), and a bipolar junction transistor (BJT).

The second circuit unit PWMUb may include first to sixth transistors T1 to T6, an eighth transistor T8, and a first capacitor C1.

The first transistor T1 may have a gate electrode connected to a first node N1, a first electrode connected to a second node N2, and a second electrode connected to a third node N3. The second transistor T2 may have a gate electrode connected to a first scan line GW1 i, a first electrode connected to the data line DLj, and a second electrode connected to the second node N2. The third transistor T3 may have a gate electrode connected to the first scan line GW1 i, a first electrode connected to the first node N1, and a second electrode connected to the third node N3. The fourth transistor T4 may have a gate electrode connected to the first initialization line GI1i, a first electrode connected to the first node N1, and a second electrode connected to a first voltage line VINT. The first capacitor C1 may have a first electrode connected to the sweep line SWi, and a second electrode connected to the first node N1. The fifth transistor T5 may have a gate electrode connected to the first emission line EWi, a first electrode connected to a second voltage line VDDW, and a second electrode connected to the second node N2. The sixth transistor T6 may have a gate electrode connected to the first emission line EWi, a first electrode connected to the third node N3, and a second electrode connected to a fourth node N4. The eighth transistor T8 may have a gate electrode connected to the second initialization line GI2i, a first electrode connected to the sweep line SWi, and a second electrode connected to a third voltage line VGH. For example, each of the third transistor T3 and the fourth transistor T4 may include series-connected sub-transistors. Accordingly, a leakage current of the first node N1 may be prevented or substantially prevented from occurring.

The first circuit unit PAMUb may include ninth to fourteenth transistors T9 to T14, sixteenth to eighteenth transistors T16, T17, and T18, and a second capacitor C2.

The ninth transistor T9 may have a gate electrode connected to a fourth node N4, a first electrode connected to a fifth node N5, and a second electrode connected to a sixth node N6. The tenth transistor T10 may have a gate electrode connected to a second scan line GW2i, a first electrode connected to the first global data line VRA, and a second electrode connected to the fifth node N5. The eleventh transistor T11 may have a gate electrode connected to the second scan line GW2i, a first electrode connected to the fourth node N4, and a second electrode connected to the sixth node N6. The twelfth transistor T12 may have a gate electrode connected to the second initialization line GI2i, a first electrode connected to the fourth node N4, and a second electrode connected to the first voltage line VINT. The thirteenth transistor T13 may have a gate electrode connected to the first emission line EWi, a first electrode connected to the first power line VDDA, and a second electrode connected to the fifth node N5. The fourteenth transistor T14 may have a gate electrode connected to the second emission line EAi, a first electrode connected to the sixth node N6, and a second electrode connected to the anode of the light emitting element LE. The second capacitor C2 may include a first electrode, and a second electrode of the second capacitor C2 may be connected to the fourth node N4. The sixteenth transistor T16 may have a gate electrode connected to the first emission line EWi, a first electrode connected to the first power line VDDA, and a second electrode connected to the first electrode of the second capacitor C2. The seventeenth transistor T17 may have a gate electrode connected to the second scan line GW2i, a first electrode connected to a second voltage line VDDW, and a second electrode connected to the first electrode of the second capacitor C2. The eighteenth transistor T18 may have a gate electrode connected to the second initialization line GI2i, a first electrode connected to the anode of the light emitting element LE, and a second electrode connected to the second power line VSS. For example, each of the eleventh transistor T11 and the twelfth transistor T12 may include series-connected sub-transistors. Accordingly, a leakage current of the fourth node N4 may be prevented or substantially prevented from occurring.

Figure 22:
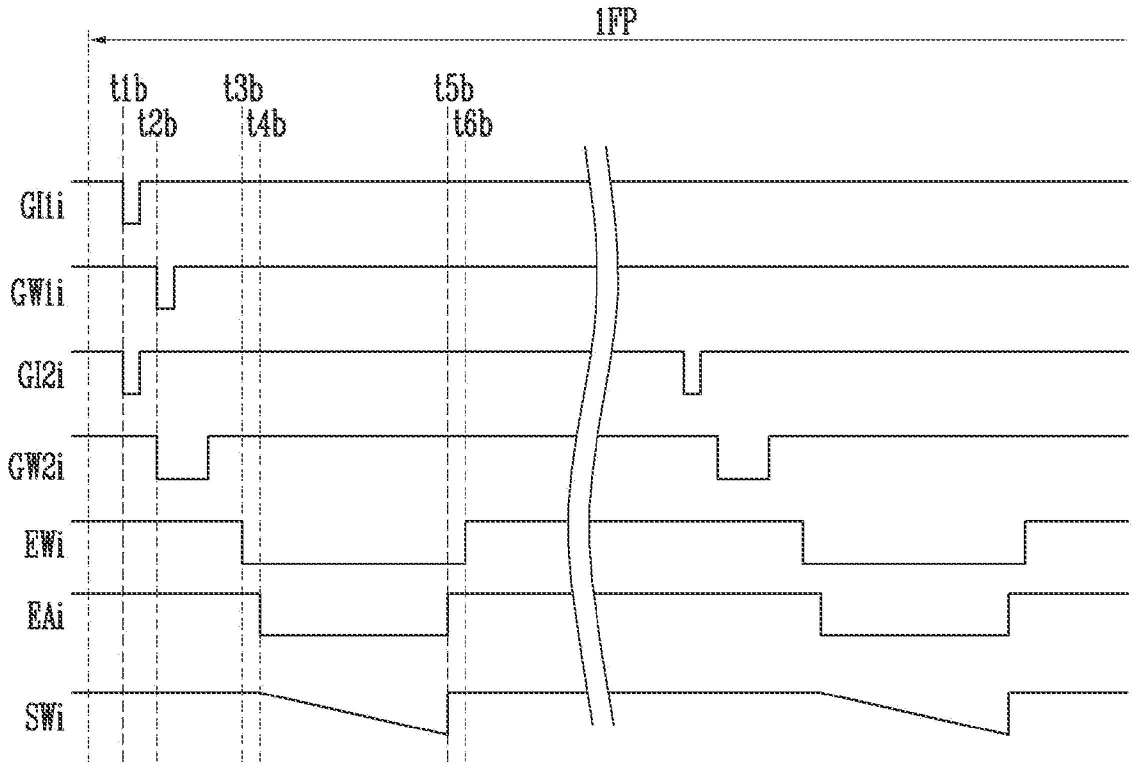
FIG. 22 is a diagram illustrating a driving method of the pixel circuit of FIG. 21.

FIG. 22 is a diagram illustrating a driving method of the pixel circuit of FIG. 21. The driving method of the sub-pixel SPXijb is described in more detail based on one frame period 1FP with reference to FIG. 22.

First, at a time t1 b, a first initialization signal of a turn-on level (e.g., a logic low level) may be applied to the first initialization line GI1i, and a second initialization signal of a turn-on level (e.g., a logic low level) may be applied to the second initialization line GI2i. Accordingly, a voltage (e.g., a both end voltage) of the first capacitor C1 may be set by the fourth transistor T4 and the eighth transistor T8 that are turned on. For example, the both end voltage of the first capacitor C1 may correspond to a voltage difference between a voltage of the third voltage line VGH and a voltage of the first voltage line VINT. At this time, the first transistor T1 may be turned on by the voltage of the first node N1. In addition, a voltage of the fourth node N4 may have (e.g., may be set to) a voltage level (e.g., a turn-on level) of the first voltage line VINT by the turned on twelfth transistor T12, and the ninth transistor T9 may be turned on. In addition, a voltage (e.g., a both end voltage) of the light emitting element LE may have (e.g., may be set to) a voltage of the second power line VSS through the turned on eighteenth transistor T18. Accordingly, a black expression of the light emitting element LE may be improved.

Next, at a time point t2b, a first scan signal of a turn-on level (e.g., a logic low level) may be applied to the first scan line GW1 i, and a second scan signal of a turn-on level (e.g., a logic low level) may be applied to the second scan line GW2i. Therefore, the second transistor T2, the third transistor T3, the tenth transistor T10, the eleventh transistor T11, and the seventeenth transistor T17 may be turned on. At this time, the data voltage of the data line DLj is applied to the first node N1 through the second transistor T2, the first transistor T1, and the third transistor T3 that are turned on. The voltage of the first node N1 is a compensation voltage in which a threshold voltage of the first transistor T1 is reflected. In addition, the first global data voltage of the first global data line VRA is applied to the fourth node N4 through the tenth transistor T10, the ninth transistor T9, and the eleventh transistor T11 that are turned on. At this time, a voltage of the fourth node N4 is a compensation voltage in which a threshold voltage of the ninth transistor T9 is reflected. Therefore, a deviation of the threshold voltage due to a process deviation of the first transistor T1 and the ninth transistor T9 may be compensated for.

Next, at a time point t3b, a first emission signal of a turn-on level (e.g., a logic low level) may be applied to the first emission line EWi. Therefore, the fifth transistor T5, the sixth transistor T6, the thirteenth transistor T13, and the sixteenth transistor T16 may be turned on.

Next, at a time point t4b, a second emission signal of a turn-on level (e.g., a logic low level) may be applied to the second emission line EAi. Accordingly, the fourteenth transistor T14 is turned on, and the driving current sequentially flows through the first power line VDDA, the thirteenth transistor T13, the ninth transistor T9, the fourteenth transistor T14, the light emitting element LE, and the second power line VSS. Accordingly, the light emitting element LE may emit light having a desired luminance corresponding to an amount of the driving current.

At the time point t4b, a voltage of a sweep signal of the sweep line SWi may gradually decrease. At this time, due to coupling of the first capacitor C1, the voltage of the first node N1 also gradually decreases. As the voltage of the first node N1 at the time point t2b increases, a time point at which the first transistor T1 is turned on may be delayed. As the voltage of the first node N1 at the time t2b decreases, the time point at which the first transistor T1 is turned on may be earlier. When the first transistor T1 is turned on during a period from t4b to t5b, a voltage of the fourth node N4 may have (e.g., may be set to) a voltage level (e.g., a logic high level) of the second voltage line VDDW. Accordingly, the ninth transistor T9 is turned off, and supply of the driving current flowing to the light emitting element LE is stopped. As a stop time point of the driving current is earlier, a luminance of the sub-pixel SPXijb that may be visually recognized with respect to a corresponding frame period 1FP may decrease. On the other hand, as the stop time point of the driving current is delayed, the luminance of the sub-pixel SPXijb that may be visually recognized with respect to the corresponding frame period 1FP may increase.

When the sub-pixel SPXijb emits light with a full-white grayscale (e.g., a full-while grayscale level) in the frame period 1FP, at a time point t5b, as a second light emitting signal of a turn-off level is applied to the second emission line EAi, the fourteenth transistor T14 may be turned off, and the supply of the driving current may be stopped.

According to an embodiment, the second initialization signal, the second scan signal, the first emission signal, the second emission signal, and the sweep signal may be repeatedly provided, even after a time point t6b of the corresponding frame period 1FP. Accordingly, a desired luminance waveform of the sub-pixel SPXijb may be provided.

Next, an electrical test method of the sub-pixel SPXijb of FIG. 21 is described in more detail.

Because the second circuit unit PWMUb is connected to the independent data line DLj, electrically testing for determining whether the transistors T1 to T6 and T8 normally operate may be performed. For example, it may be checked whether the second transistor T2 and the fifth transistor T5 are normally operating, by setting the second transistor T2 and the fifth transistor T5 to a turn-on state, and checking whether a voltage of the data line DLj has (e.g., is set to) the voltage of the second voltage line VDDW. Similarly, it may be checked whether the second transistor T2, the first transistor T1, the third transistor T3, and the fourth transistor T4 are normally operating, by setting the second transistor T2, the first transistor T1, the third transistor T3, and the fourth transistor T4 to a turn-on state, and checking whether the voltage of the data line DLj has (e.g., is set to) the voltage of the first voltage line VINT. However, the present disclosure is not limited thereto, and the electrical test of the second circuit unit PWMUb may be possible by using other suitable methods, in addition to those described above.

However, because the first circuit unit PAMUb is connected to the first global data line VRA that is common to the first sub-pixels, an electrical test through the first global data line VRA may be difficult. On the other hand, according to the present embodiment, because the test transistor T19 is provided, the electrical test of the first circuit unit PAMUb may be possible through the data line DLj.

The electrical test of the first circuit unit PAMUb may be performed in the same or substantially the same manner as that of the driving method described above with reference to FIG. 22. In the driving method described above with reference to FIG. 22, because the test transistor T19 is always in a turn-off state, the driving current flows to the light emitting element LE. On the other hand, during the electrical test of the first circuit unit PAMUb, after the data voltage is written to the first node N1, the test transistor T19 is set to a turn-on state, and thus, the driving current is caused to flow to the data line DLj through the test transistor T19. Accordingly, it may be checked whether the first circuit unit PAMUb normally operates by sensing the driving current through the data line DLj.

An example electrical test sequence of the first circuit unit PAMUb is described in more detail as follows. First, in a state in which the test transistor T19 is turned off, a data voltage corresponding to 255 grayscale (e.g., a white grayscale level) is applied to the first node N1 (e.g., at time point t2b). Second, in a state in which the test transistor T19 is turned on, the first emission signal and the second emission signal of the logic low level are supplied during one horizontal period, and a current flowing through the data line DLj is sensed. Third, in a state in which the test transistor T19 is turned off, a data voltage corresponding to 128 grayscale (e.g., a middle grayscale level) is applied to the first node N1 (e.g., at time point t2b). Fourth, in a state in which the test transistor T19 is turned on, the first emission signal and the second emission signal of the logic low level are supplied during one horizontal period, and the current flowing through the data line DLj is sensed. Fifth, in a state in which the test transistor T19 is turned off, a data voltage corresponding to 0 grayscale (e.g., a black grayscale level) is applied to the first node N1 (e.g., at time point t2b). Sixth, in a state in which the test transistor T19 is turned on, the first emission signal and the second emission signal of the logic low level are supplied during one horizontal period, and the current flowing through the data line DLj is sensed.

The electronic or electric devices and/or any other relevant devices or components according to embodiments of the present disclosure described herein (e.g., the control unit, the UI generation unit, the signal processing unit, the additional data processing unit, the video processing unit, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

first sub-pixels commonly connected to a first global data line, each of the first sub-pixels comprising a first light emitting element configured to emit light of a first color; and second sub-pixels commonly connected to a second global data line different from the first global data line, each of the second sub-pixels comprising a second light emitting element configured to emit light of a second color different from the first color, wherein at least one of the first sub-pixels comprises:

a first circuit configured to supply a driving current to the first light emitting element based on a first global data voltage received from the first global data line;

a second circuit configured to control a supply period of the driving current based on a data voltage received from a data line; and a test transistor comprising a first electrode connected to an anode of the first light emitting element, and a second electrode connected to the data line.

2. The display device according to claim 1, wherein the second circuit comprises:

a first transistor comprising a gate electrode connected to a first node, a first electrode connected to a second node, and a second electrode connected to a third node;

a second transistor comprising a gate electrode connected to a scan line, a first electrode connected to the data line, and a second electrode connected to the second node;

a third transistor comprising a gate electrode connected to the scan line, a first electrode connected to the first node, and a second electrode connected to the third node;

a fourth transistor comprising a gate electrode connected to a first initialization line, a first electrode connected to the first node, and a second electrode connected to a first voltage line; and a first capacitor comprising a first electrode connected to a sweep line, and a second electrode connected to the first node.

3. The display device according to claim 2, wherein the second circuit further comprises:

a fifth transistor comprising a gate electrode connected to a first light emitting line, a first electrode connected to a second voltage line, and a second electrode connected to the second node;

a sixth transistor comprising a gate electrode connected to the first light emitting line, a first electrode connected to the third node, and a second electrode connected to a fourth node;

a seventh transistor comprising a gate electrode connected to a second initialization line, a first electrode connected to the fourth node, and a second electrode connected to the first voltage line; and an eighth transistor comprising a gate electrode connected to the second initialization line, a first electrode connected to the sweep line, and a second electrode connected to a third voltage line.

4. The display device according to claim 3, wherein the first circuit comprises:

a ninth transistor comprising a gate electrode connected to a fifth node, a first electrode connected to a sixth node, and a second electrode connected to a seventh node;

a tenth transistor comprising a gate electrode connected to the scan line, a first electrode connected to the first global data line, and a second electrode connected to the sixth node;

an eleventh transistor comprising a gate electrode connected to the scan line, a first electrode connected to the fifth node, and a second electrode connected to the seventh node;

a twelfth transistor comprising a gate electrode connected to the first initialization line, a first electrode connected to the fifth node, and a second electrode connected to the first voltage line;

a thirteenth transistor comprising a gate electrode connected to the first light emitting line, a first electrode connected to a first power line, and a second electrode connected to the sixth node;

a fourteenth transistor comprising a gate electrode connected to a second light emitting line, a first electrode, and a second electrode connected to the anode; and a fifteenth transistor comprising a gate electrode connected to the fourth node, a first electrode connected to the seventh node, and a second electrode connected to the first electrode of the fourteenth transistor.

5. The display device according to claim 4, wherein the first circuit further comprises:

a second capacitor comprising a first electrode, and a second electrode connected to the fifth node;

a sixteenth transistor comprising a gate electrode connected to the first light emitting line, a first electrode connected to the first electrode of the second capacitor, and a second electrode connected to the first power line;

a seventeenth transistor comprising a gate electrode connected to the second initialization line, a first electrode connected to the second voltage line, and a second electrode connected to the first electrode of the second capacitor;

a third capacitor comprising a first electrode connected to the fourth node, and a second electrode connected to the first voltage line; and an eighteenth transistor comprising a gate electrode connected to the second initialization line, a first electrode connected to the anode, and a second electrode connected to a second power line.

6. The display device according to claim 3, wherein the first circuit comprises:

a ninth transistor comprising a gate electrode connected to a fifth node, a first electrode connected to a sixth node, and a second electrode connected to a seventh node;

a tenth transistor comprising a gate electrode connected to the scan line, a first electrode connected to the first global data line, and a second electrode connected to the sixth node;

an eleventh transistor comprising a gate electrode connected to the scan line, a first electrode connected to the fifth node, and a second electrode connected to the seventh node;

a twelfth transistor comprising a gate electrode connected to the first initialization line, a first electrode connected to the fifth node, and a second electrode connected to the first voltage line;

a thirteenth transistor comprising a gate electrode connected to the first light emitting line, a first electrode connected to a first power line, and a second electrode connected to the sixth node; and a second capacitor comprising a first electrode connected to the fourth node, and a second electrode connected to the fifth node.

7. The display device according to claim 6, wherein the first circuit further comprises:

a fourteenth transistor comprising a gate electrode connected to a second light emitting line, a first electrode connected to the seventh node, and a second electrode connected to the anode; and an eighteenth transistor comprising a gate electrode connected to the second initialization line, a first electrode connected to the anode, and a second electrode connected to a second power line.

8. The display device according to claim 1, wherein the second circuit comprises:

a first transistor comprising a gate electrode connected to a first node, a first electrode connected to a second node, and a second electrode connected to a third node;

a second transistor comprising a gate electrode connected to a first scan line, a first electrode connected to the data line, and a second electrode connected to the second node;

a third transistor comprising a gate electrode connected to the first scan line, a first electrode connected to the first node, and a second electrode connected to the third node; and a first capacitor comprising a first electrode connected to a sweep line, and a second electrode connected to the first node.

9. The display device according to claim 8, wherein the second circuit further comprises:

a fourth transistor comprising a gate electrode connected to a first initialization line, a first electrode connected to the first node, and a second electrode connected to a first voltage line;

a fifth transistor comprising a gate electrode connected to a first light emitting line, a first electrode connected to a second voltage line, and a second electrode connected to the second node;

a sixth transistor comprising a gate electrode connected to the first light emitting line, a first electrode connected to the third node, and a second electrode connected to a fourth node; and an eighth transistor comprising a gate electrode connected to a second initialization line, a first electrode connected to the sweep line, and a second electrode connected to a third voltage line.

10. The display device according to claim 9, wherein the first circuit comprises:

a ninth transistor comprising a gate electrode connected to the fourth node, a first electrode connected to a fifth node, and a second electrode connected to a sixth node;

a tenth transistor comprising a gate electrode connected to a second scan line, a first electrode connected to the first global data line, and a second electrode connected to the fifth node;

an eleventh transistor comprising a gate electrode connected to the second scan line, a first electrode connected to the fourth node, and a second electrode connected to the sixth node;

a twelfth transistor comprising a gate electrode connected to the second initialization line, a first electrode connected to the fourth node, and a second electrode connected to the first voltage line;

a thirteenth transistor comprising a gate electrode connected to the first light emitting line, a first electrode connected to a first power line, and a second electrode connected to the fifth node; and a second capacitor comprising a first electrode, and a second electrode connected to the fourth node.

11. The display device according to claim 10, wherein the first circuit further comprises:

a fourteenth transistor comprising a gate electrode connected to a second light emitting line, a first electrode connected to the sixth node, and a second electrode connected to the anode;

a sixteenth transistor comprising a gate electrode connected to the first light emitting line, a first electrode connected to the first power line, and a second electrode connected to the first electrode of the second capacitor;

a seventeenth transistor comprising a gate electrode connected to the second scan line, a first electrode connected to the second voltage line, and a second electrode connected to the first electrode of the second capacitor; and an eighteenth transistor comprising a gate electrode connected to the second initialization line, a first electrode connected to the anode, and a second electrode connected to a second power line.

12. A tiled display device comprising:

a plurality of display devices; and a seam between the plurality of display devices, wherein a first display device from among the plurality of display devices comprises:

first sub-pixels commonly connected to a first global data line, each of the first sub-pixels comprising a first light emitting element configured to emit light of a first color; and second sub-pixels commonly connected to a second global data line different from the first global data line, each of the second sub-pixels comprising a second light emitting element configured to emit light of a second color different from the first color, and wherein at least one of the first sub-pixels further comprises a test transistor comprising a first electrode connected to an anode of the first light emitting element, and a second electrode connected to a data line different from the first global data line.

13. The tiled display device according to claim 12, wherein each of the first light emitting element and the second light emitting element is a flip chip type of a micro light emitting diode element.

14. The tiled display device according to claim 12, wherein the first display device further comprises a substrate configured to support the first sub-pixels and the second sub-pixels on a first surface of the substrate, and wherein the substrate comprises glass.

15. The tiled display device according to claim 14, wherein the first display device comprises:

a pad on the first surface of the substrate;

a first back surface pad on a second surface of the substrate opposite to the first surface of the substrate; and a side surface line covering a portion of a side surface of the substrate, and connecting the pad and the first back surface pad to each other.

16. The tiled display device according to claim 15, wherein the first display device further comprises:

a second back surface pad on the second surface of the substrate; and a flexible film connected to the second back surface pad through a conductive adhesive member.

17. The tiled display device according to claim 14, wherein the first display device further comprises a light blocking layer on the first surface of the substrate, the light blocking layer overlapping with the first light emitting element and the second light emitting element, and not overlapping with transistors configuring the first sub-pixels and the second sub-pixels.

18. The tiled display device according to claim 17, wherein a disposition direction of a cathode and the anode of the first light emitting element is opposite to a disposition direction of a cathode and an anode of the second light emitting element.

19. The tiled display device according to claim 17, wherein the first display device further comprises third sub-pixels, each comprising a third light emitting element configured to emit light of a third color different from the first color and the second color, and wherein a disposition direction of a cathode and an anode of the third light emitting element is the same as a disposition direction of a cathode and an anode of the second light emitting element.

20. The tiled display device according to claim 12, wherein the first global data line, the second global data line, and the data line are located at the same metal layer as each other.

* * * * *